US010959372B2

(12) United States Patent
Goman et al.

(10) Patent No.: US 10,959,372 B2
(45) Date of Patent: Mar. 30, 2021

(54) FIXED HEAD WALK REEL MOWER WITH A PIVOTALLY ADJUSTABLE TRACTION DRUM HAVING DIFFERENT MOWING POSITIONS

(71) Applicant: The Toro Company, Bloomington, MN (US)

(72) Inventors: Gerald E. Goman, Spring Valley, WI (US); Robert D. Patton, New Prague, MN (US)

(73) Assignee: The Toro Company, Bloomington, MN (US)

( * ) Notice: Subject to any disclaimer, the term of this patent is extended or adjusted under 35 U.S.C. 154(b) by 144 days.

(21) Appl. No.: 15/765,882

(22) PCT Filed: Oct. 13, 2016

(86) PCT No.: PCT/US2016/056759
§ 371 (c)(1),
(2) Date: Apr. 4, 2018

(87) PCT Pub. No.: WO2017/066396
PCT Pub. Date: Apr. 20, 2017

(65) Prior Publication Data
US 2018/0279548 A1    Oct. 4, 2018

Related U.S. Application Data

(60) Provisional application No. 62/241,458, filed on Oct. 14, 2015.

(51) Int. Cl.
*A01D 34/47*     (2006.01)
*A01D 34/62*     (2006.01)
(Continued)

(52) U.S. Cl.
CPC ........... *A01D 34/475* (2013.01); *A01D 34/49* (2013.01); *A01D 34/53* (2013.01); *A01D 34/54* (2013.01);
(Continued)

(58) Field of Classification Search
CPC ...... A01D 34/475; A01D 34/53; A01D 34/49; A01D 34/54; A01D 34/62; A01D 2101/00; A01D 34/47
See application file for complete search history.

(56) References Cited

U.S. PATENT DOCUMENTS

| 1,995,842 | A | * | 3/1935 | Forrest, V | ............ | A01D 34/475 |
| | | | | | | 56/11.1 |
| 3,000,647 | A | * | 9/1961 | Fox | ........................ | A01D 34/74 |
| | | | | | | 280/43.17 |

(Continued)

FOREIGN PATENT DOCUMENTS

| BE | 867890 A | * | 10/1978 | ............. | A01D 34/74 |
| EP | 0478020 A2 | * | 4/1992 | ............. | A01D 34/74 |

(Continued)

OTHER PUBLICATIONS

The Toro Company, Greensmaster 1000 and 1600 Walk-Behind Mower Operator's Manual, 2010.
(Continued)

*Primary Examiner* — Arpad Fabian-Kovacs
(74) *Attorney, Agent, or Firm* — James W. Miller

(57) ABSTRACT

A fixed head walk reel mower has a frame supported for rolling over the ground. A reel cutting unit comprising a rotatable reel and a cooperating bedknife has a fixed orientation on the frame. The frame pivotally carries a ground engaging pivotal rear traction drum that can be selectively disposed in two different mowing positions when cutting grass at lower or higher height of cut ranges, respectively.

(Continued)

This allows a single mower to cut grass at lower heights of cut on golf course greens as well as at higher heights of cut on tee boxes while minimizing degradation in cutting or power performance.

7 Claims, 15 Drawing Sheets

(51) Int. Cl.
*A01D 34/49* (2006.01)
*A01D 34/54* (2006.01)
*A01D 34/53* (2006.01)
*A01D 101/00* (2006.01)

(52) U.S. Cl.
CPC .......... *A01D 34/62* (2013.01); *A01D 2101/00* (2013.01)

(56) References Cited

U.S. PATENT DOCUMENTS

| | | | | |
|---|---|---|---|---|
| 3,918,239 A * | 11/1975 | Aldred | ................ | A01D 34/54 56/7 |
| 4,525,989 A * | 7/1985 | Lane | ................ | A01D 34/64 56/17.4 |
| 4,644,737 A * | 2/1987 | Arnold | ................ | A01D 34/42 56/249 |
| 4,680,922 A * | 7/1987 | Arnold | ................ | A01D 34/42 56/249 |
| 4,756,101 A | 7/1988 | Friberg et al. | | |
| 4,878,339 A * | 11/1989 | Marier | ................ | A01D 34/64 56/14.7 |
| 5,036,651 A * | 8/1991 | Nelson | ................ | A01D 43/02 56/16.4 R |
| 5,142,852 A * | 9/1992 | Nelson | ................ | A01D 43/02 56/16.6 |
| 5,203,151 A * | 4/1993 | Mills | ................ | A01D 34/54 172/427 |
| 5,241,810 A * | 9/1993 | Reichen | ................ | A01D 34/54 56/17.1 |
| 5,398,489 A * | 3/1995 | Oshima | ................ | A01D 34/68 56/17.2 |
| 5,526,633 A * | 6/1996 | Strong | ................ | A01D 34/74 280/43.13 |
| 5,661,959 A * | 9/1997 | Vargas | ................ | A01D 34/003 56/7 |
| 5,797,252 A * | 8/1998 | Goman | ................ | A01D 34/74 56/17.2 |
| 6,195,969 B1 * | 3/2001 | Yilmaz | ................ | A01D 42/005 56/14.7 |
| 6,339,918 B1 * | 1/2002 | Thomas | ................ | A01D 34/74 56/17.2 |
| 7,111,443 B2 | 9/2006 | Anderson et al. | | |
| 7,114,318 B2 * | 10/2006 | Poulson | ................ | A01D 34/54 56/249 |
| 7,121,073 B2 * | 10/2006 | Schmidt | ................ | A01D 34/53 56/249 |
| 7,370,461 B2 * | 5/2008 | Silbernagel | ............ | A01D 34/62 56/249 |
| 7,631,479 B2 * | 12/2009 | Thier | ................ | A01D 34/62 56/249 |
| 8,387,350 B2 * | 3/2013 | Slater | ................ | A01D 34/54 56/17.2 |
| 2003/0145570 A1 * | 8/2003 | Berndt | ................ | A01D 34/003 56/6 |
| 2004/0216438 A1 * | 11/2004 | Poulson | ................ | A01D 34/54 56/17.1 |
| 2006/0090439 A1 * | 5/2006 | Anderson | ............ | A01D 34/47 56/10.2 G |
| 2009/0038284 A1 * | 2/2009 | Goman | ................ | A01D 34/47 56/17.1 |
| 2009/0249761 A1 * | 10/2009 | Rinholm | ................ | A01D 43/00 56/249 |
| 2010/0199623 A1 | 8/2010 | Akahane | | |
| 2013/0047569 A1 * | 2/2013 | Takahashi | ............ | A01D 34/54 56/14.9 |
| 2013/0199147 A1 * | 8/2013 | Akahane | ................ | A01D 34/47 56/249 |
| 2018/0132418 A1 * | 5/2018 | Bartel | ................ | A01D 34/74 |
| 2019/0150360 A1 * | 5/2019 | Aposhian | ............ | A01D 34/006 |

FOREIGN PATENT DOCUMENTS

| | | | | |
|---|---|---|---|---|
| GB | 977086 | | 12/1964 | |
| JP | H04234907 | | 8/1992 | |
| JP | 05199809 A | * | 8/1993 | ............ A01D 34/52 |
| JP | 08037870 A | * | 2/1996 | ............ A01D 34/54 |
| JP | H09154304 | | 6/1997 | |

OTHER PUBLICATIONS

The Toro Company, Greensmaster 1000 Mower Parts Catalog, 2010.
Korean Intellectual Property Office, International Search Report and Written Opinion, dated 2017.
Japanese Patent Office, Search Report and Office Action in corresponding Japanese application No. 2018-517404, dated Jul. 21, 2020.
Ihi Shibaura Machinery Corporation, G-EXE 22/26 Walk-Behind Greens Mower (i.e. the Offset Moving System on p. 3 for adjusting the bedknife/reel interface), undated but admitted prior art.
The Toro Company, Portions of Drawings showing Toro Part Nos. 112-9281 and 112-9278 Bedbar options for Toro Greensmaster 1000 Walk-Behind Mower, drawings undated but admitted prior art.
British Patent Office, Examination Report in corresponding British application No. GB1804467, dated Nov. 4, 2020.

* cited by examiner

FIXED HEAD WALK REEL MOWER WITH A PIVOTALLY ADJUSTABLE TRACTION DRUM HAVING DIFFERENT MOWING POSITIONS

TECHNICAL FIELD

This invention relates to a walk reel mower having a rotatable cutting reel that sweeps grass against a sharpened bedknife for shearing the grass against the bedknife.

BACKGROUND OF THE INVENTION

Walk reel mowers are known for mowing grass at extremely low heights of cut on the greens of golf courses and at low, but somewhat higher heights of cut, on the tee boxes of golf courses. Traditionally, in order to maintain quality of cut and effective power usage when cutting, two different reel mowers have typically been employed for these two different but related uses, one reel mower being optimized for cutting grass on the greens and another reel mower that is optimized for cutting grass on the tee boxes. The need to purchase, maintain, and have on hand both types of reel mowers is obviously more costly to the operator of the golf course. It would be an advance in the art if a single reel mower could handle both cutting tasks without having its cutting or power performance be degraded in either task.

As reel mowers are used, either walk reel mowers or reel mowers comprising one or more reel cutting units that might be propelled by a common traction frame, the diameter of the cutting reel decreases over time as the reel wears. This decrease in diameter is undesirable in terms of the ability of a grass shield that partially surrounds the cutting reel to properly direct the grass clippings being generated by the operation of the reel. In the past, a typical reel mower grass shield has included a vertically adjustable lip that could be moved downwardly as the reel diameter became smaller in an attempt to maintain a constant spacing. However, such a lip then presents a surface on which grass clippings often impact and collect, thus degrading the grass clipping directing performance of the grass shield when the lip is deployed to compensate for the wear of the cutting reel. It would be a further advance in the art to provide a better solution to the problem of compensating for a reduction in the diameter of the cutting reel due to wear without any diminishment in the ability of the grass shield to direct and discharge grass clippings therefrom.

U.S. Pat. No. 7,111,443 discloses a walk reel mower having an automatic slow in turn system that automatically slows the ground speed of the mower during turns of the mower as when the user is swinging the mower around approximately 180° to make a cutting pass in a direction opposite to the direction of the preceding cutting pass. However, such a system works by detecting the change in orientation between the reel cutting unit and the frame of the mower that is caused when the user pushes down on the handle assembly to initiate such a turn. This system would not work on a fixed head reel mower in which the reel cutting unit does change its orientation relative to the frame. Moreover, some embodiments of this system utilize a switch or sensor of some type to detect the change in cutting unit orientation and complicated electronic controllers to reduce the ground speed in accordance with such detection. A simpler slow in turn system applicable to fixed head greensmowers and/or having simple mechanical components rather than electrical components is needed in the reel mower art.

Finally, many reel mowers have kickstands that can be selectively deployed by the user to elevate the rear end of the frame of the reel mower in order to allow the installation of transport wheels on the axles of the split drum halves of the typical traction drum. However, the deployment of such kickstands requires the user to put the kickstand into engagement with the ground and then pull up and back on the handle assembly to muscle the reel mower back up and at least partially over the kickstand. This is difficult for many users, particularly smaller users, to do. Thus, a more easily deployable kickstand in which the user would have more leverage in deploying the kickstand is desirable.

SUMMARY OF THE INVENTION

One aspect of this invention relates to a walk reel mower which comprises a frame supported for rolling over the ground by a front roller and a pair of rotatable rear traction members carried by the frame. The rear traction members are powered by a prime mover carried by the frame to self-propel the frame over the ground. A rearwardly and upwardly extending handle assembly is provided on the frame to allow a user to stand behind the frame in a walk behind position and to grip the handle assembly and operate the mower from the walk behind position. A reel cutting unit is carried by the frame. The reel cutting unit is fixed to the frame during a grass cutting operation such that the reel cutting unit is able to follow ground contours only through ground contour following provided by the front roller and rear traction members carried by the frame. A height adjustment structure connects the front roller to the frame to allow the vertical height of the front roller relative to the frame to be adjusted upwardly or downwardly to adjust a height of cut provided by the reel cutting unit. The rear traction members are movably mounted on the frame to be selectively repositionable by a user between first and second mowing positions on the frame. The second mowing position is displaced vertically downwardly on the frame compared to the first mowing position. The movement of the rear traction members between the first and second mowing positions is independent of and separate from operation of the height adjustment structure.

Another aspect of this invention relates to a reel mower which comprises a frame supported for rolling over the ground, the frame having a pair of laterally spaced side plates. A reel cutting unit is carried by the frame. The reel cutting unit comprises a laterally extending cutting reel rotatably journalled between the side plates of the frame for rotation about a substantially horizontal rotational axis, the cutting reel having a plurality of blades. The reel cutting unit further comprises a laterally extending bedknife extending between the side plates of the frame, the bedknife having a cutting edge that severs standing uncut grass in a shearing action as the blades of the cutting reel push the standing uncut grass against the cutting edge of the bedknife in a lower portion of a circular orbit of rotation of the cutting reel, the shearing action between the bedknife and the cutting reel creating grass clippings that are thrown generally rearwardly relative to the frame immediately after the grass clippings are generated by the shearing action. In addition, a laterally extending grass shield extending between the side plates of the frame is provided. The grass shield has an arcuate portion extending approximately around at least an upper rear quadrant of the orbit of the cutting reel to redirect and discharge the grass clippings generally forwardly relative to the frame. The arcuate portion of the grass shield has a radial spacing of a desired predetermined amount relative to the upper rear quadrant of the orbit of the cutting reel. The grass shield is pivotally adjustable relative to the frame and relative to the reel cutting unit about a substantially horizontal pivot axis to permit the arcuate portion of the shield to be pivoted in a direction that restores the radial spacing to the desired predetermined amount after the radial spacing has increased due to a reduction in a diameter of the cutting reel caused by wear of the cutting reel.

Yet another aspect of this invention relates to a walk reel mower which comprises a frame supported for rolling over the ground by a plurality of rotatable ground engaging members carried by the frame. A rearwardly and upwardly extending handle assembly is carried on the frame to allow a user to stand behind the frame in a walk behind position and to grip the handle assembly and operate the mower from the walk behind position. A reel cutting unit and a prime mower are both carried by the frame. The prime mover has a throttle that provides the prime mover with a variable rotational speed depending upon a position of the throttle within a range of throttle motion between a low idle speed of the prime mover and a nominal maximum working speed of the prime mover. A traction drive system is operatively connected to the prime mover for driving at least one of the ground engaging members to self-propel the frame over the ground at a ground speed that is proportionally related to the rotational speed of the engine. Finally, a ground speed control system comprises a user movable throttle control, a user movable throttle reducing control, and a mechanical cable assembly operatively coupling the throttle control and the throttle reducing control to the prime mover throttle. The mechanical cable assembly is configured to allow the user to operate the movable throttle control to mechanically set and maintain the prime mover throttle in a desired position within the range of throttle motion to establish a desired nominal ground speed for the frame, to allow the user to operate the throttle reducing control independently of any movement of the throttle control to temporarily reduce the ground speed of the frame below the nominal ground speed for so long as the user maintains the throttle reducing control in an actuated condition, and to permit the ground speed of the frame to return to the desired nominal ground speed once the user no longer maintains the throttle reducing control in its actuated condition.

A final aspect of this invention relates to a walk reel mower which comprises a frame supported for rolling over the ground by a plurality of rotatable ground engaging members carried by the frame. A rearwardly and upwardly extending handle assembly is provided on the frame to allow a user to stand behind the frame in a walk behind position and to grip the handle assembly and operate the mower from the walk behind position. A reel cutting unit is carried by the frame. A kickstand assembly is also provided. The kickstand assembly comprises a kickstand that pivots on the handle assembly from a stowed position into a partially deployed position in which the kickstand has an upper portion that abuts against the handle assembly and a lower ground engaging portion that is left positioned above the ground in the partially deployed position. The handle assembly is pivotally connected to the frame for pivoting about a substantially horizontal pivot axis from at least one operational position to a kickstand deploying position which is less upright than the at least one operational position. The handle assembly and the frame include a cooperating lock for allowing the user to selectively locate the handle assembly in either the at least one upright operational position or the kickstand deploying position with the lock retaining the handle assembly in the selected position. The handle assembly when located in and retained in the kickstand deploying position allows the user to use push down on the handle assembly to use leverage provided by the handle assembly in the kickstand deploying position thereof to force the kickstand further downwardly from the partially deployed position to a fully deployed position in which the lower ground engaging portion of the kickstand is forced into engagement with the ground to thereby elevate a rear portion of the frame above the ground.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

The Overall Mower

Figure 1:
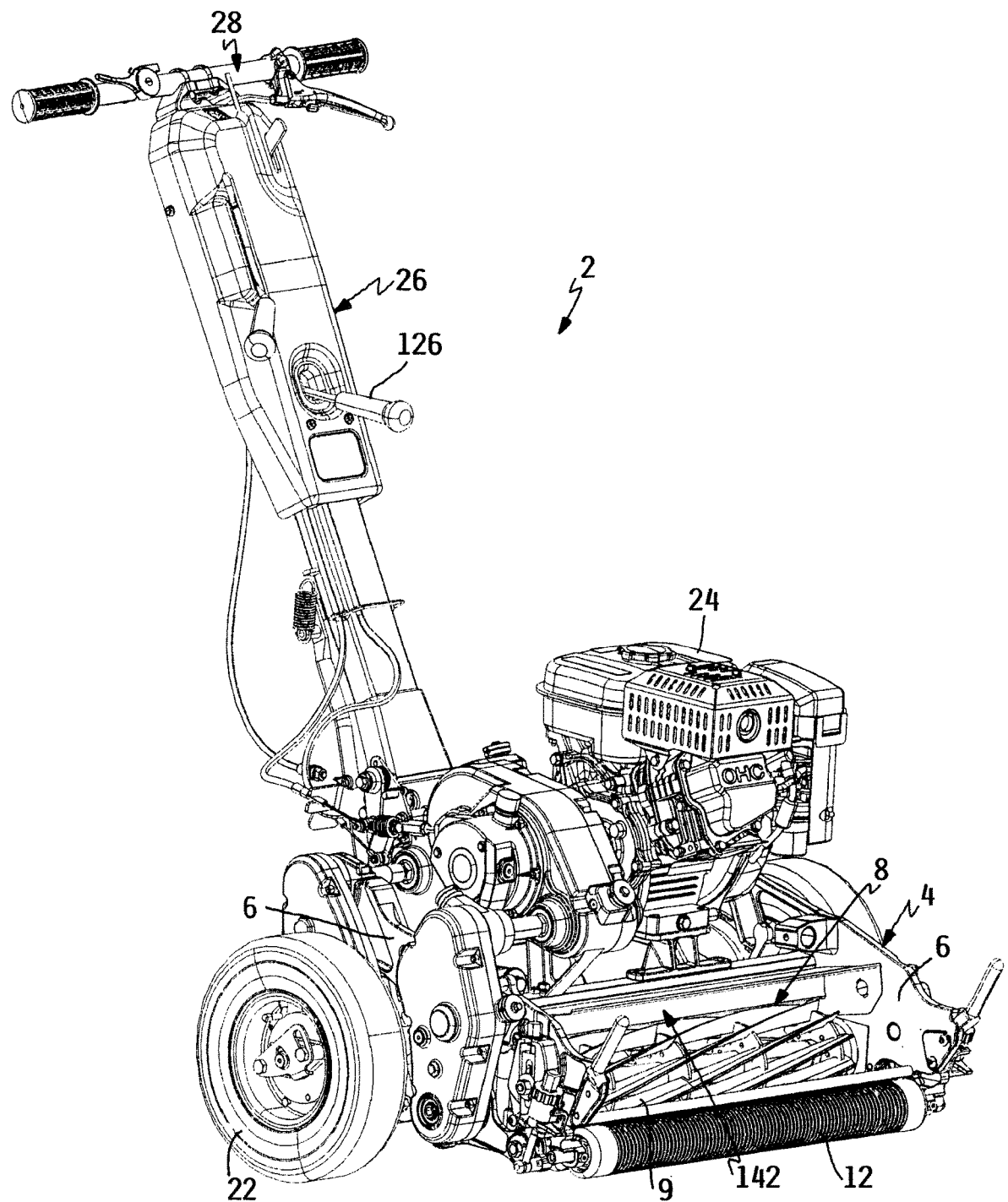
FIG. 1 is a front perspective view of one embodiment of a walk reel mower according to this invention.
Figure 2:
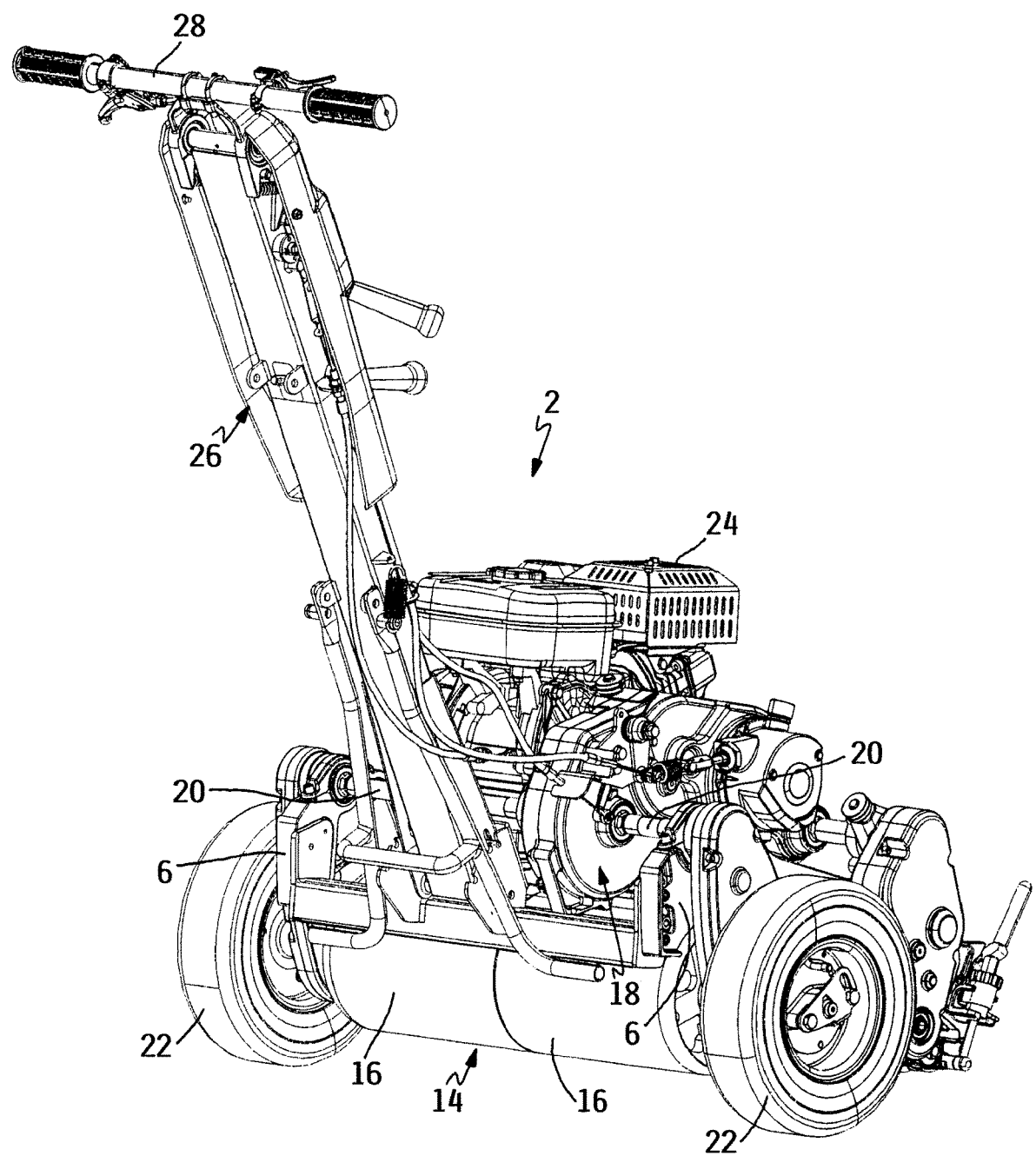
FIG. 2 is a rear perspective view of the mower of FIG. 1.

One embodiment of a walk reel mower according to this invention is illustrated generally as 2 in FIGS. 1 and 2. Mower 2 as illustratively depicted herein comprises a greensmower that cuts grass on the greens of golf courses at very low heights of cut. More particularly, mower 2 comprises a fixed head greensmower in which the reel cutting unit does not have its own separate ground contour following action apart from the ground contour following action that is provided by mower 2. However, the various features of this invention are not limited to greensmowers or to fixed head greensmowers, but may be used on walk reel mowers generally.

Mower 2 includes a frame 4 that includes a pair of laterally spaced side plates 6 that are rigidly joined together by various cross members. A laterally extending cutting reel 8 having a plurality of circumferentially spaced, helical blades 9 is rotatably journalled between side plates 6 of frame 4. As reel 8 rotates about a substantially horizontal axis of rotation coinciding with the axis of reel 8, reel blades 9 sweep standing grass against a laterally extending bedknife 10 that is positioned adjacent a lower portion of the orbit of reel 8. Bedknife 10 has a sharpened cutting edge 11 such that the blades of standing grass are cut in a shearing action as reel blades 9 push the standing grass against the cutting edge of bedknife 10. See FIG. 15. Together, reel 8 and bedknife 10 form a reel cutting unit.

Mower frame 4 is supported for rolling over the ground by a front roller 12 positioned ahead of reel 8 and by a large diameter rear traction drum 14, visible in FIG. 2, positioned behind reel 8. Drum 14 is split into two halves 16 and powers or self-propels mower 2 over the ground during a grass cutting operation. A differential transmission 18 is contained on mower frame 4. The drive shafts 20 of differential 18 are operatively coupled by separate drive trains to drum halves 16 so that drum halves 16 are able to rotate at different speeds when mower 2 is traveling on a curved path, thus preventing scuffing of the grass.

The axles of drum halves 16 extend laterally beyond drum halves 16 to allow transport wheels 22 to be optionally installed when mower 2 is placed into a transport mode versus its usual cutting mode. While transport wheels 22 are shown in FIGS. 1 and 2, transport wheels 22 are absent when mower 2 is used for cutting grass. For example, see FIGS. 9 and 10 where transport wheels 22 have been removed such that drum 14 is the only rolling support for the rear end of mower frame 4. Alternatively, drum 14 could be deleted entirely in favor of a single set of traction wheels that would remain on mower 2 in both the cutting and the transport modes.

An internal combustion engine 24 is carried on frame 4 for providing power to reel 8 and to differential 18 for driving the same. Engine 24 includes a typical throttle valve (not shown) for progressively increasing the speed of engine 24 between a low idle speed and a nominal maximum working speed. The drive through differential 18 to drum 14 is designed to provide a ground speed for mower 2 that is proportionally related to the speed of engine 24. Thus, the operator slows mower 2 down by reducing the speed of engine 24 and speeds mower 2 up by increasing the speed of engine 24. The drive to reel 8 maintains a fixed speed ratio between the speed of reel 8 and the speed of drum 14 to maintain a constant clip (the amount of forward distance mower 2 travels between successive contacts of a reference point on reel blades 9 with the grass). The drive to reel 8 may be adjustable to select different speed ratios to allow the user to select between different clips.

Mower frame 4 includes a rearwardly and upwardly extending handle assembly 26. The handle assembly includes a laterally extending hand grip 28 that is long enough for a user to grip with both hands. Various operational controls are contained on handle assembly 26 for manipulation by the user.

The Slow in Turn System

Figure 3:
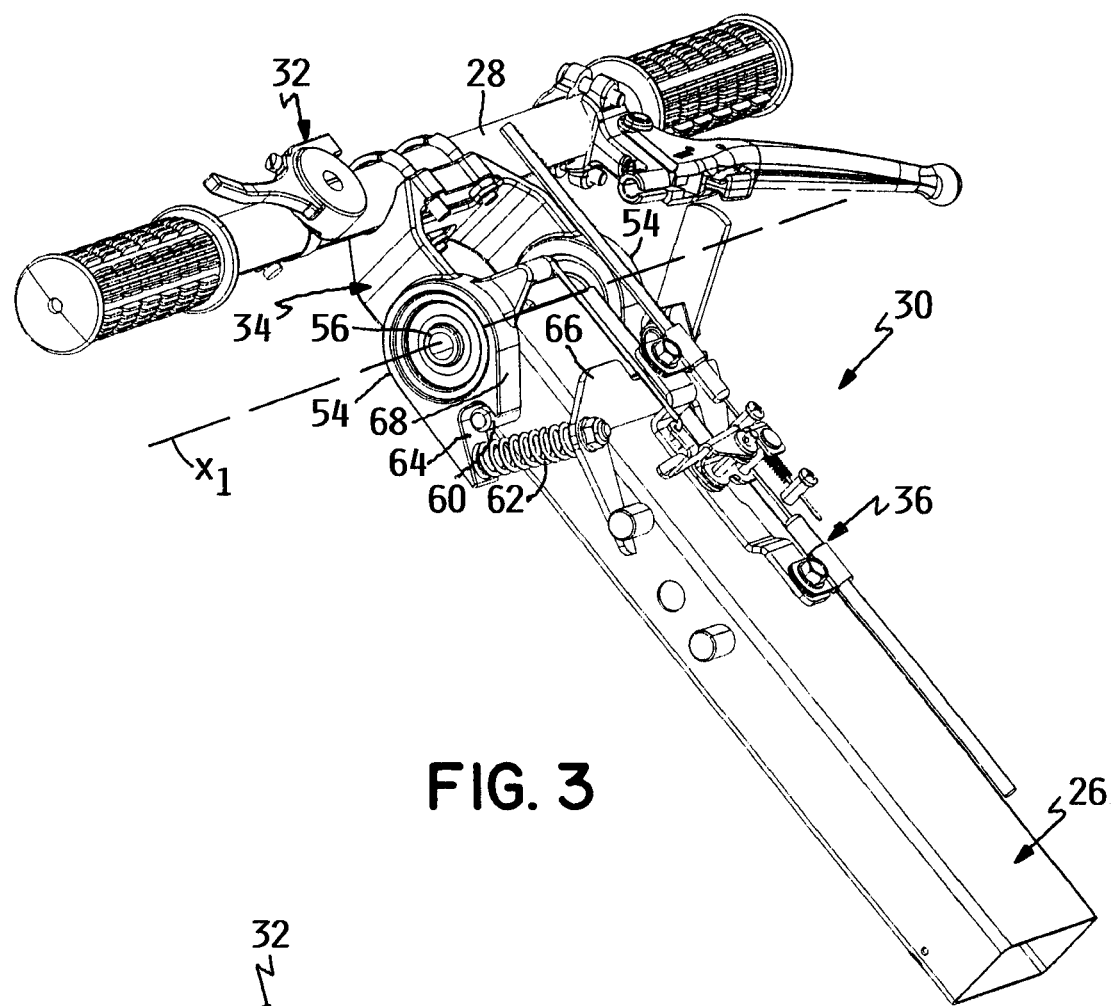
FIG. 3 is a perspective view of a portion of the mower of FIG. 1, particularly illustrating a slow in turn system of the mower.
Figure 4:
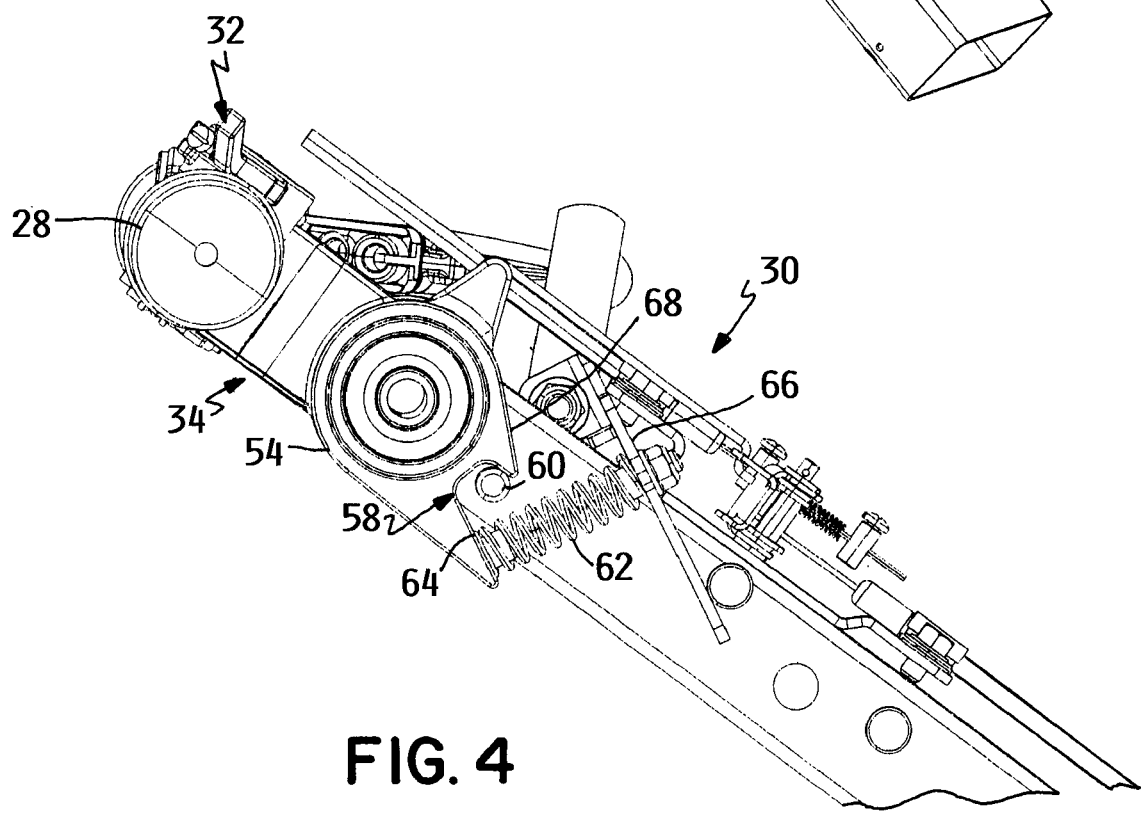
FIG. 4 is a side elevational view of the slow in turn system of FIG. 3.

One aspect of this invention is a slow in turn system, illustrated generally as 30 in FIGS. 3 and 4, that automatically slows mower 2 down from the user set ground speed whenever the user turns mower 2 to go in a different direction. By way of example, this happens at the end of every pass when the user is cutting a turf surface such as that on a green on a golf course. As the user reaches the end of a given pass, the user pushes down on handle assembly 26 to lift the front of mower 2 off the ground to stop cutting grass, the user then pushes forwardly on one side of handle assembly 26 while pulling rearwardly on the opposite side of handle assembly 26 to swing mower 2 around approximately 180° to position mower 2 for the next pass going back in the opposite direction, and finally the user stops pushing down on handle assembly 26 to let the front of mower 2 lower back down into engagement with the grass to resume cutting grass as the next pass begins. Slow in turn system 30 which will now be described automatically and temporarily slows down the ground speed of mower 2 during this turn around procedure so that the user does not have to run to keep up with mower 2 due to the fact the user has to cover a greater arcuate distance than does mower 2 during the turn. Without the slow down system, some users, particularly shorter users, cannot keep up with mower 2 during a turn around without having to break into a run.

Referring now to FIGS. 3 and 4, one embodiment of slow in turn system 30 comprises three major components: 1.) a user movable throttle control, illustrated generally as 32, contained on handle assembly 26, 2.) a user movable throttle reducing control, illustrated generally as 34, also contained on or forming part of handle assembly 26, and 3) a mechanical cable assembly, illustrated generally as 36, coupling throttle control 32 and throttle reducing control 34 to the engine throttle valve. These components together permit the user to mechanically set the engine throttle valve to a desired position within its range of motion to establish a desired nominal ground speed for mower 2 through a first movement of cable assembly 36 in a first direction, but to temporarily reduce the ground speed of mower 2 below the nominal ground speed through a second movement of cable assembly 36 in an opposite second direction. Preferably, the temporary ground speed reduction of mower 2 occurs automatically during a turn of mower 2 whenever the user pushes down on hand grip 28 of handle assembly 26 to lift the front of mower 2 off the ground in preparation for a change in direction. This automatic operation occurs because throttle reducing control 34 that is carried on or forms part of handle assembly 26 is automatically actuated by the act of the user pushing down on hand grip 28 of handle assembly 26.

Figure 5:
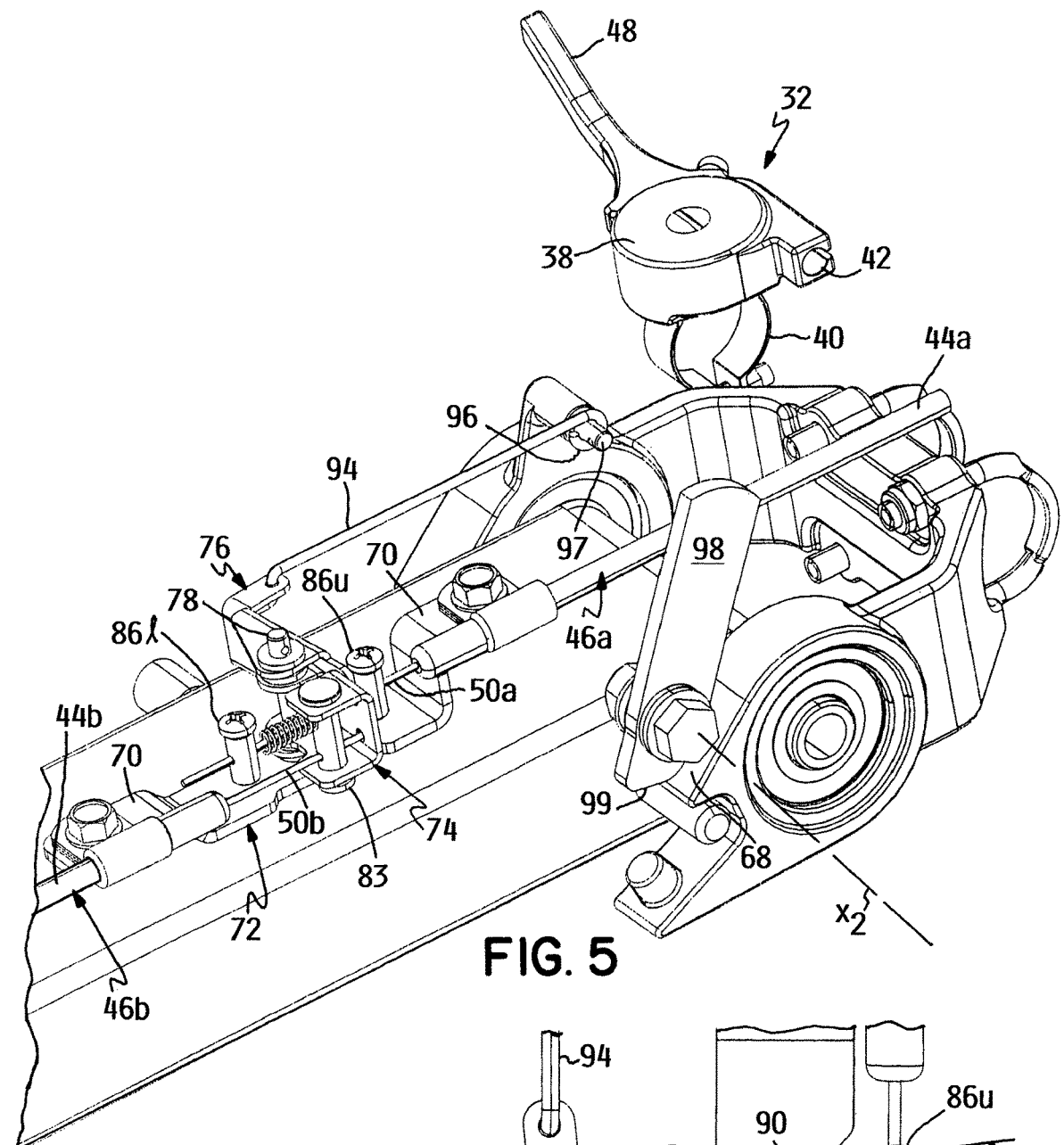
FIG. 5 is an enlarged perspective view of portions of the slow in turn system of FIG. 3 taken from the opposite side of the mower compared to the side of the mower to which the view of FIG. 3 was directed.

Turning now to a description of the components of slow in turn system 30 of this invention, throttle control 32 comprises a body 38 having a clamp 40 for clamping body 38 to hand grip 28 of handle assembly 26. See FIGS. 3 and 5. As best shown in FIG. 5, body 38 has an opening 42 in which an upper end of the outer sheath 44a of a first Bowden cable 46a may be fixedly secured. Body 38 includes an outwardly extending pivotal lever 48 to which an upper end of the inner wire 50a of first cable 46a is attached. Lever 48 is retained by some type of friction applying mechanism in whatever position it has been set by the user.

Throttle control 32 is positioned on hand grip 28 so that a user who is gripping hand grip 28 can extend the thumb of the user's right hand into engagement with lever 48 to push lever 48 forwardly. As will be explained hereafter in more detail, this action advances the engine throttle valve to increase the speed of the engine and thus the nominal ground speed of mower 2 to a desired value. Conversely, the user can pull back on lever 48 to retard the position of the engine throttle valve to select a lower nominal ground speed of mower 2.

Throttle reducing control 34 comprises hand grip 28 of handle assembly 26 and particularly a pivotal mount of hand grip 28 to the remainder of handle assembly 26. Referring to FIGS. 3 and 4, hand grip 28 includes a downwardly facing U-shaped yoke having laterally spaced yoke arms 54 positioned adjacent opposite sides of the upper end of the remainder of handle assembly 26. Yoke arms 54 are pivoted to the remainder of handle assembly 26 by a horizontal pivot pin 56 such that hand grip 28 is pivotal about a substantially horizontal axis $x_1$.

The front end of each yoke arm 54 has a U-shaped opening 58 surrounding an outwardly extending stop 60 on one side of the remainder of handle assembly 26. A compression spring 62 is arranged between a lower arm 64 of each yoke arm opening 58 and a fixed abutment 66 on the remainder of handle assembly 26. Referring to FIG. 4, compression springs 62 acting on lower arms 64 of yoke arm openings 58 bias hand grip 28 in a clockwise direction about pivot pin 56 until upper arms 68 of yoke arm openings 58 abut against their respective stops 60 on the remainder of handle assembly 26. In such a position, there is a small angular gap between lower arms 64 of yoke arm openings arms 58 and stops 60.

Turning now to the final major component of slow in turn system 30, cable assembly 36 comprises the first Bowden cable 46a having its upper end connected to throttle control 32 in the above described manner and a second Bowden cable 46b having its lower end (not shown) connected to the engine throttle valve. In this regard, second cable 46b has the lower end of the inner wire 50b thereof attached to the engine throttle valve while the lower end of the outer sheath 44b of second cable 46b is fixedly attached to mower frame 4 at some point adjacent engine 24. The opposite ends of the outer sheaths 44a, 44b of first and second cables 46a, 46b are clamped to elevated ears 70 at each end of a mounting plate 72. Plate 72 is fixed, e.g. by welding, to the top of the remainder of handle assembly 26. Ears 70 are at different vertical elevations relative to plate 72 such that the inner wires 50a, 50b of the first and second cables 46a, 46b overlie one another in a vertically offset manner as best shown in FIG. 5.

Figure 7:
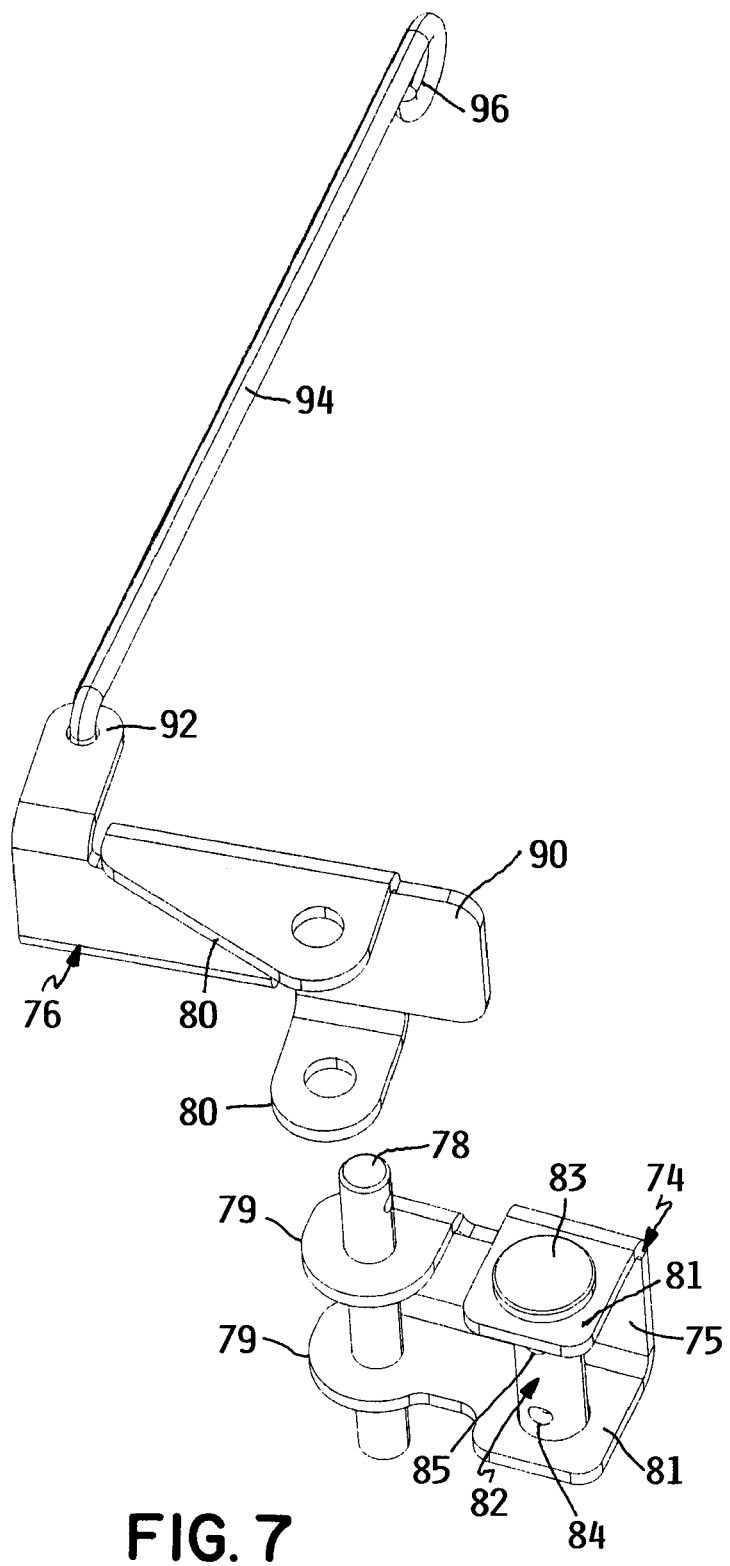
FIG. 7 is an enlarged perspective view in partially exploded form of the speed setting and the speed reducing members of the slow in turn system of FIG. 3.

Cable assembly 36 further includes an integration structure that unites the motion of first and second cables 46a, 46b in a manner that satisfies the goals of slow in turn system 30 of this invention. The integration structure includes two members, namely a speed setting member 74 and a speed reducing member 76, both of which are pivotally journalled on an upwardly extending pivot pin 78 carried on plate 72. Members 74 and 76 are independently pivotally mounted on pivot pin 78 by sets of vertically spaced tabs 79, 80 thereon having aligned holes therein for receiving pivot pin 78. See FIG. 7. Various washers (not shown) may be used between tabs 79, 80.

Speed setting member 74 has another set of tabs 81 that is laterally displaced to one side of pivot pin 78. A first cable barrel connector 82 extends vertically through tabs 81 to form an attachment device for securing the upper end of wire 50b of second cable 46b to speed setting member 74. Specifically, first connector 82 includes an enlarged head 83 at one end of the barrel thereof that rests atop the upper tab 81 on speed setting member 74. First connector 82 includes a first through hole 84 positioned between tabs 81 into which the upper end of wire 50b of second cable 46b may be inserted such that the wire 50b passes through the barrel of first connector 82. A set screw or bolt 83 on the other end of first connector 82 is then threaded up into the other end of the barrel of first connector 82 to firmly and rigidly engage wire 50b. When so connected, the upper end of wire 50b of second cable 46b is effectively fixedly secured to speed setting member 74.

First connector 82 used on speed setting member 74 has a second through hole 85 positioned above first hole 84. Hole 85 slidably receives the lower end of inner wire 50a of first cable 46a such that wire 50a of first cable 46a is free to slide back and forth within hole 85. Thus, wire 50a of first cable 46a is not directly attached to speed setting member 74 as is true of wire 50b of second cable 46b. Instead, wire 50a of first cable 46a carries spaced upper and lower cable barrel connectors 86u and 86l, respectively, affixed thereto to form first and second abutments on wire 50a. The abutments formed by connectors 86 are on opposite sides of first connector 82 with upper connector 86u being positioned above a rear wall 75 of speed setting member 74. A compression spring 88 surrounds the lower end of wire 50a with spring 88 bearing at its lower end against lower connector 86*l* on wire 50*a* of first cable 46*a* and at its upper end against first connector 82 on wire 50*b* of second cable 46*b*.

Figure 6:
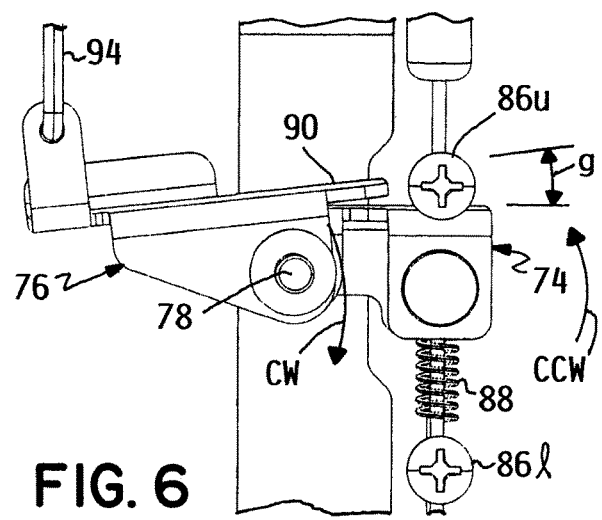
FIG. 6 is a top plan view of portions of the slow in turn system of FIG. 3, particularly illustrating a first pivotal speed setting member and a second pivotal speed reducing member of the slow in turn system and further illustrating the angular offset or gap that is present between the members at slow idle.

Finally, speed reducing member 76 comprises a laterally extending finger 90 that is positioned to overlie rear wall 75 of speed setting member 74 as best shown in FIG. 6. The opposite side of speed reducing member 76 has an eyelet 92 to which one end of an elongated connecting rod 94 is attached. The other end of connecting rod 94 is bent into a hook 96 to hook onto a laterally extending pin 97 on one yoke arm 54 of the hand grip 28. Thus, speed reducing member 76 is operatively connected to hand grip 28 such that pivotal motion of hand grip 28 will pivot speed reducing member 76 about pivot pin 78.

Turning now to the operation of slow in turn system 30 of this invention, when lever 48 of throttle control 32 is in its most rearwardly pulled position on hand grip 28, first cable 46*a* will be positioned as shown in FIG. 6 with upper connector 86*u* thereon holding speed setting member 74 in the position illustrated such that second cable 46*b* will position the engine throttle valve at its low idle setting. In this non-advanced setting of throttle control 32, speed reducing member 76 will be slightly angularly oriented relative to speed setting member 74 such that a small angular gap g will be present between finger 90 on speed reducing member 76 and rear wall 75 of speed setting member 74.

To select a desired ground speed for mower 2, the user advances throttle control 32 by pushing forwardly on lever 48 of throttle control 32. As this happens, connectors 86*u* and 86*l* are pulled upwardly as the lower end of inner wire 50*a* of first cable 46*a* rises due to the movement of lever 48 of throttle control 32. During this motion, lower connector 86*l* pushes upwardly on the first connector 82 of speed setting member 74 through spring 88 positioned between the two. The force applied to connector 82 of speed setting member 74 causes speed setting member 74 to rotate in a counter-clockwise direction about pivot pin 78 as indicated by the arrow CCW in FIG. 6. This rotation of speed setting member 74 pulls upwardly on wire 50*b* of second cable 46*b* to rotate the engine throttle valve of engine 24 in an engine speed increasing direction due to the connection of the lower end of inner wire 50*b* of second cable 46*b* with the engine throttle valve.

When lever 48 of throttle control 32 reaches its most advanced position corresponding to the highest nominal engine speed and nominal ground speed of mower 2, rear wall 75 of speed setting member 74 has abutted with finger 90 of speed reducing member 76 and the angular gap g between them has been closed. Thus, operation of throttle control 32 effectively conjointly operates both cables 50*a*, 50*b* of cable assembly 36 such that the setting of throttle control 32 establishes the setting of the engine throttle valve on engine 24. These settings will remain unchanged as long as the user leaves throttle control 32 in the selected position.

When the user pushes down on hand grip 28 of handle assembly 26 to initiate a turn of mower 2, the initial portion of the push causes hand grip 28 to pivot with respect to the remainder of handle assembly 26 about pivot pin 78. The range of this pivoting motion is very small, approximately 10° or so, before lower arm 64 of each yoke arm 54 hits the corresponding stop 60 to lock out any further pivoting motion of hand grip 28. Thus, once hand grip 28 can no longer pivot on the remainder of handle assembly 26 after its brief initial pivoting motion, continued downward force by the user on hand grip 28 is effectively then communicated through handle assembly 26 to mower frame 4 so as to cause the front of mower 2 to lift up off the ground in its usual fashion. Once the front of mower 2 is so lifted, the user can then push forwardly and pull rearwardly on opposite sides of hand grip 28 to turn mower 2 to a different heading.

While the initial downward pivoting motion of hand grip 28 is brief and limited before such motion is locked out, such motion causes connecting rod 94 to pivot speed reducing member 76 in a clockwise direction about pivot pin 78 as indicated by the arrow CW in FIG. 6. The pivoting motion of speed reducing member 76 in this clockwise direction causes finger 90 on speed reducing member 76 to push forward or downwardly on rear wall 75 of speed setting member 74. This causes speed setting member 74 to also pivot clockwise about pivot pin 78. This in turn forces speed setting member 74 and the inner wire 50*b* of second cable 46*b* downwardly to push the engine throttle valve back towards its idle position to retard or slow down the speed of engine 24. This has the desired effect of slowing down the ground speed of mower 2 during a turn of mower 2 but only during the turn.

Once the user releases down pressure from handle assembly 26 at the conclusion of the turn, springs 62 acting on hand grip 28 will return hand grip 28 to its usual, non-pivoted position. In this non-pivoted position, speed reducing member 76 correspondingly moves back to its gapped position g relative to speed setting member 74 as shown in FIG. 6 such that the temporary speed slow down ends. Note that during the temporary speed slow down, the positions of the upper and lower connectors 86*u* and 86*l* on wire 50*a* of first cable 46*a*, which effectively provide the nominal setting of the engine throttle valve as established by the position of lever 48 of throttle control 32, remained stationary or unchanged on wire 50*a*. The temporary downward motion of speed setting member 74 caused by the temporary pivoting of the speed reducing member 76 simply further compressed spring 88 arranged between first connector 82 on speed setting member 74 and lower connector 86*l* without changing the positions of upper and lower connectors 86*u* and 86*l* on wire 50*a* of first cable 46*a*. Thus, when down pressure is released from handle assembly 26, the system resets to its prior configuration as established by the setting of lever 48.

Slow in turn system 30 of this invention as describe above works automatically without any special or separate action required from the operator other than to push down on handle assembly 26 in the normal manner that is customarily employed to turn mower 2 around or to a different direction. While hand grip 28 of handle assembly 26 is used as the throttle reducing control 34 since the first portion of the downward push slightly pivots hand grip 28 about its pivot pin, this fact is largely hidden from the user and may be unnoticed by most users. In addition, slow in turn system 30 comprises purely mechanical components and connections throughout, thus avoiding the use of electrical switches, wiring and more complicated systems. For the first time, slow in turn system 30 of this invention allows a simple, durable, and inexpensive mechanical system to be used to temporarily retard the engine throttle valve of an engine during a turn, to thereby effect a temporary slowing of the ground speed during the turn, without disturbing the preset throttle valve setting selected by the user. Thus, once the slow down during the turn ends, the engine throttle valve resets to its preselected setting and the ground speed of mower 2 increases back to its nominal desired value in a seamless and effortless manner.

As shown in FIG. 5, slow in turn system 30 may optionally include a pivotal lock out lever 98 that is pivotally carried on the remainder of the handle assembly 26 adjacent one of the yoke arms 54 of pivotal hand grip 28 for selective pivotal rotation about a horizontal pivot axis x2. In the positions shown therein, the lock out lever 98 has its lower end 99 positioned out of the way of upper arm 64 of yoke arm 54 and the pivotal motion of hand grip 28 is unimpeded. However, if so desired, the user can push forwardly and downwardly on the upper end of lock out lever 98 to swing lower end 99 of lever 98 into a closely spaced or abutting engagement with upper arm 68 of yoke arm 54. This will prevent the pivoting motion of hand grip 28 that is needed to actuate slow in turn system 30. Thus, the user may disable or turn off the operation of slow in turn system 30 simply by placing lever 98 in its lock out position in which lower end 99 of lever 98 prevents pivoting of hand grip 28.

The Kickstand Assembly

Another aspect of this invention is a kickstand assembly 100 that is significantly easier to deploy than prior art kickstands used on walk reel mowers. One embodiment of kickstand assembly 100 according to this invention comprises two major components: 1) a kickstand 102 that pivots on handle assembly 26 from a stowed position into a partially deployed position in which kickstand 102 abuts against handle assembly 26 but is left positioned above the ground, and 2) a handle assembly 26 that can be selectively released for pivoting on mower 2 frame to fully deploy kickstand 102. The pivoting motion of handle assembly 26 permits the user to first push down on handle assembly 26 to lower kickstand 102 into contact with the ground and to then continue the downward push to create sufficient leverage that pulls mower frame 4 back and up onto kickstand 102 into an inclined position to elevate drum 14 above the ground. In effect, the pivoting of handle assembly 26 after kickstand 102 has been engaged with the ground acts essentially as a jack handle. This provides the user with the ability to increase his or her leverage on mower frame 4 to ease the task of fully deploying kickstand 102 and to move mower frame 4 into its inclined, drum elevated position. In this position of drum 14, transport wheels 22 can be easily installed on or removed from the outwardly extending portions of the axles of drum 14.

Referring now to FIGS. 8-11, the first major component of kickstand assembly 100 includes a ground engaging kickstand 102 that can have many shapes. In the embodiment of kickstand 102 shown herein, one suitable shape for kickstand 102 comprises two laterally spaced, vertically extending tubes 104 that are joined together by a lower horizontal cross member 106. Tubes 104 have L-shaped lower ends which provide a horizontal ground engaging foot 108 on each tube 104. The upper ends of tubes 104 are pivotally journalled on a pair of pivot pins 110 that are carried on a pair of ears on the underside of handle assembly 26. Thus, kickstand 102 is pivotally mounted on handle assembly 26 for rotation about a substantially horizontal pivot axis $x_3$.

Figure 8:
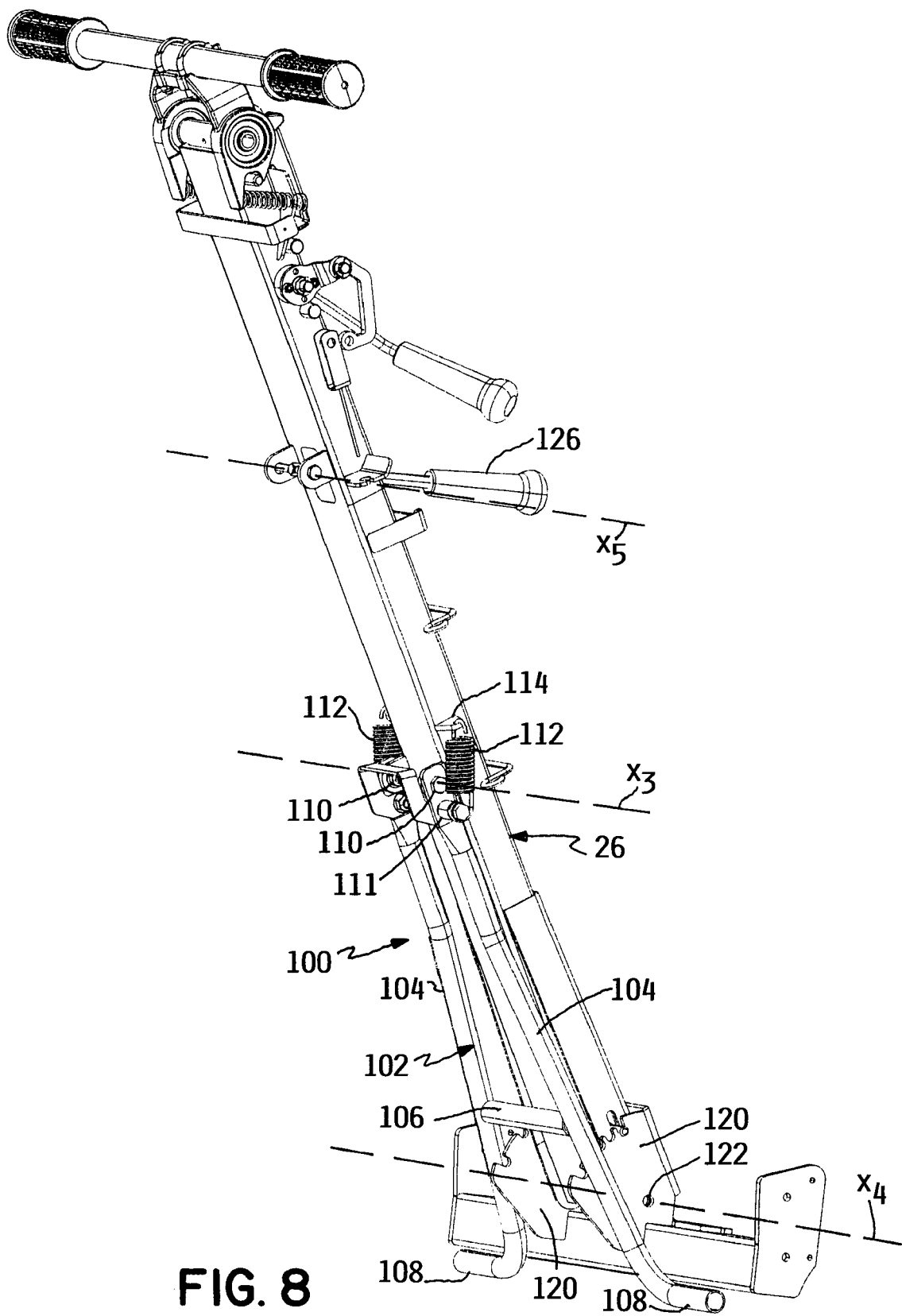
FIG. 8 is an enlarged perspective view of the handle assembly, a pivotal kickstand carried on the handle assembly, and a portion of the rear of the frame of the mower of FIG. 1.
Figure 9:
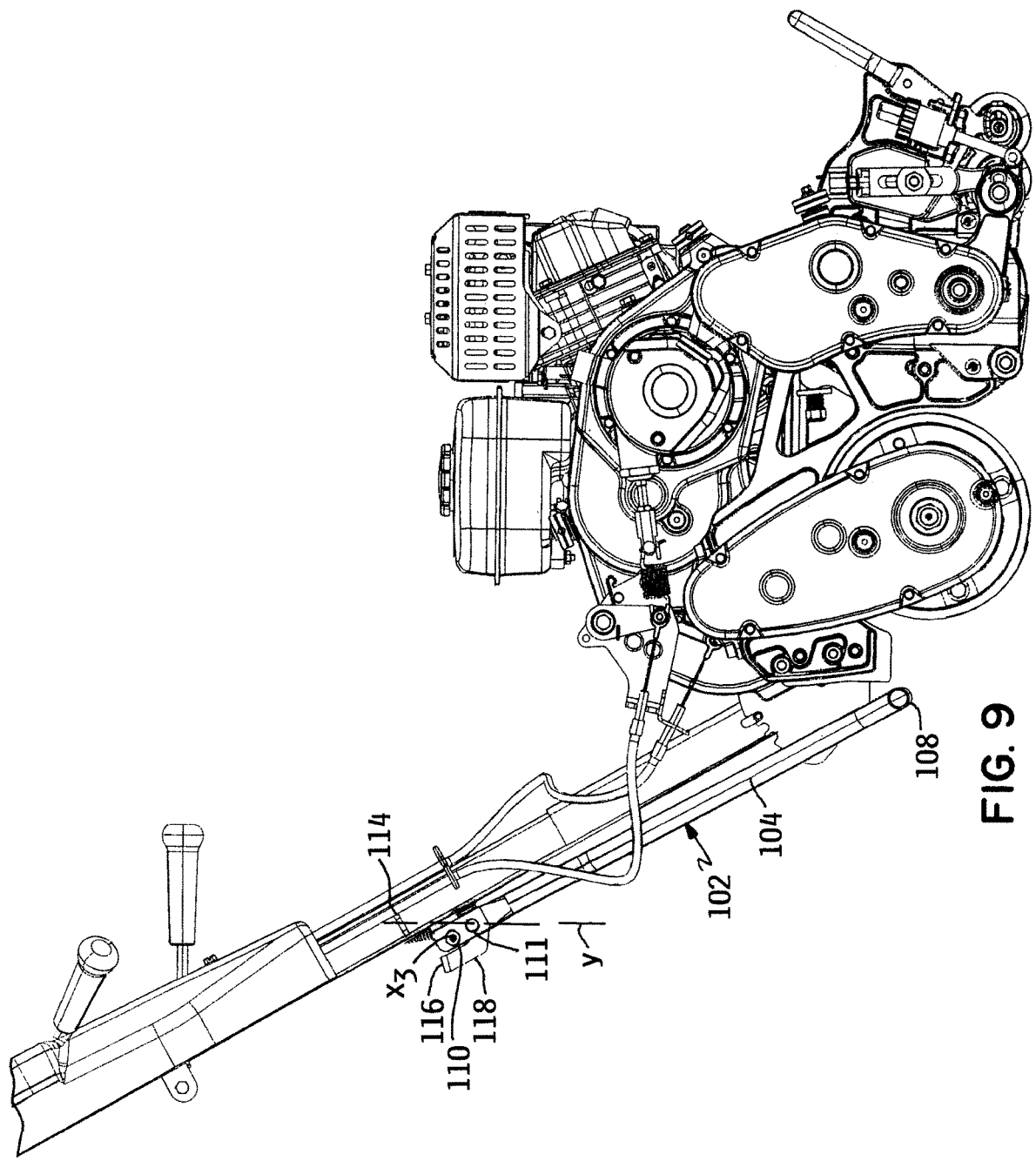
FIG. 9 is a side elevational view of the mower of FIG. 1 with the transport wheels of the mower having been removed in FIG. 9, particularly illustrating the pivotal kickstand of FIG. 8 in a stowed position on the handle assembly of the mower.

The upper ends of tubes 104 each have an outwardly extending boss 111 that serves as an anchor for the lower end of an extension spring 112. The upper end of each extension spring 112 is hooked into a laterally outwardly extending tab 114 on one side of handle assembly 26. As best shown in FIGS. 8 and 9, the extension springs have an overcenter relationship to the pivot axis $x_3$. In FIG. 9, this overcenter relationship is indicated by the axis y extending through the connection points of the ends of one extension spring 112 with such extension spring 112 having been removed for the sake of clarity. Since the distance between the connection points for the ends of extension springs 112 is far enough to place extension springs 112 in tension, the tension of extension springs 112 and their overcenter relationship along the axis y relative to the pivot axis $x_3$ as shown in FIGS. 8 and 9 biases kickstand 102 into a stowed position. In the stowed position, kickstand 102 lies substantially flat against the underside of handle assembly 26.

Figure 10:
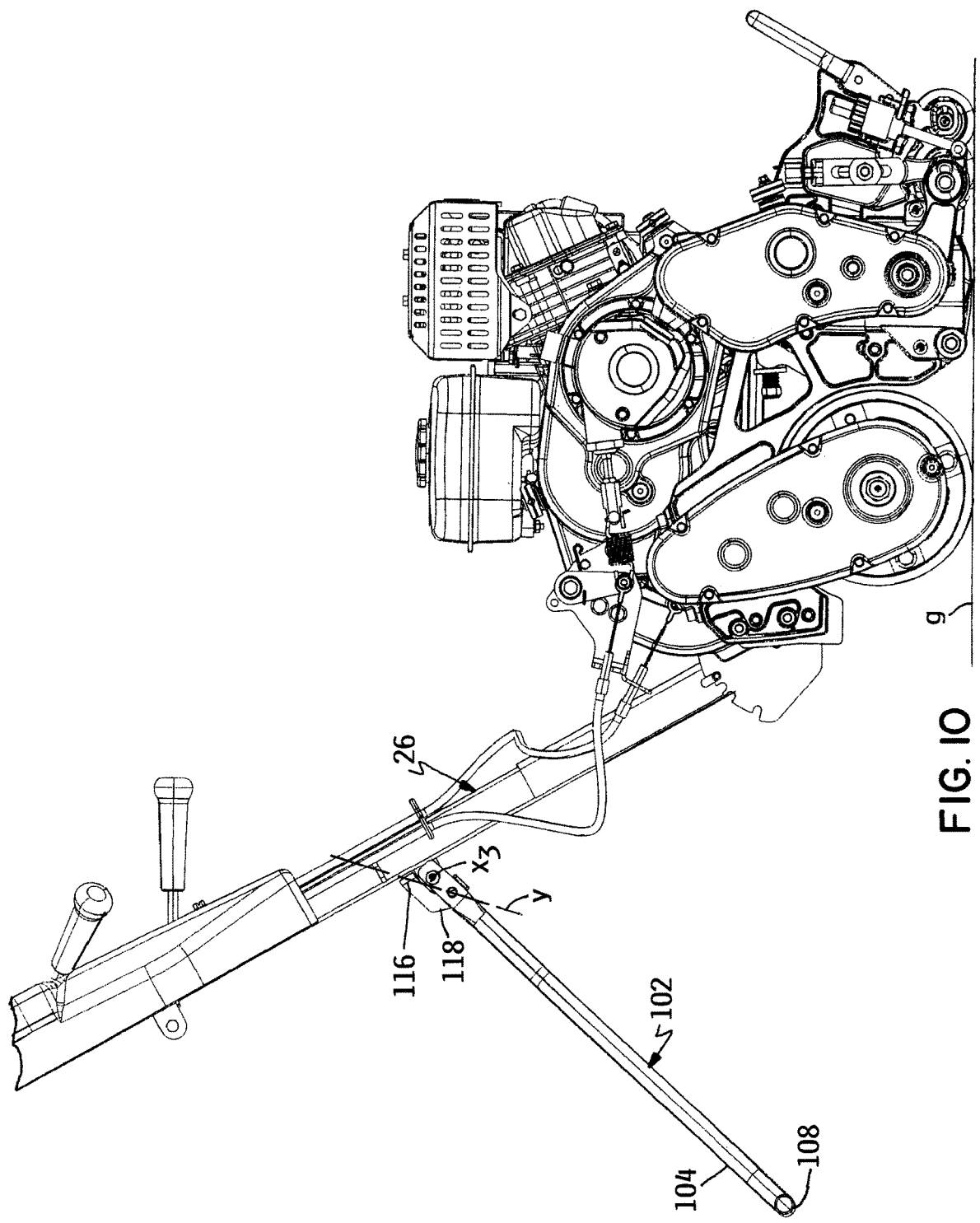
FIG. 10 is a side elevational view similar to FIG. 9, but showing the pivotal kickstand in a partially deployed position on the handle assembly with a stop on the kickstand swung into an abutting engagement with an underside of the handle assembly.

When it is desired to use kickstand 102, the user can manually grab and pivot kickstand 102 away from handle assembly 26 with kickstand 102 swinging from the stowed position of FIG. 9 into a partially deployed position that is shown in FIG. 10. In the partially deployed position, the top wall 116 of a U-shaped stop 118 that is fixed to the upper ends of tubes 104 of kickstand 102 will end up contacting the underside of handle assembly 26 in a mating, face-to-face abutting engagement. Furthermore, extension springs 112 that had previously been used in an overcenter relationship to hold kickstand 102 in the stowed position of FIG. 9 have, in the partially deployed position of FIG. 10, moved into an opposite overcenter relationship as evidenced by the fact that the axis y of extension springs 112 is now on the opposite side of the pivot axis $x_3$. Thus, extension springs 112 now hold kickstand 102 in the partially deployed position shown in FIG. 10 with top wall 116 of stop 118 abutting against the underside of handle assembly 26. In the partially deployed position of kickstand 102, the ground engaging feet 108 of kickstand 102 are elevated above the ground on which mower 2 rests. The ground is represented in FIG. 10 by the ground plane g on which drum 14 and front roller 12 of mower 2 rest.

Figure 11:
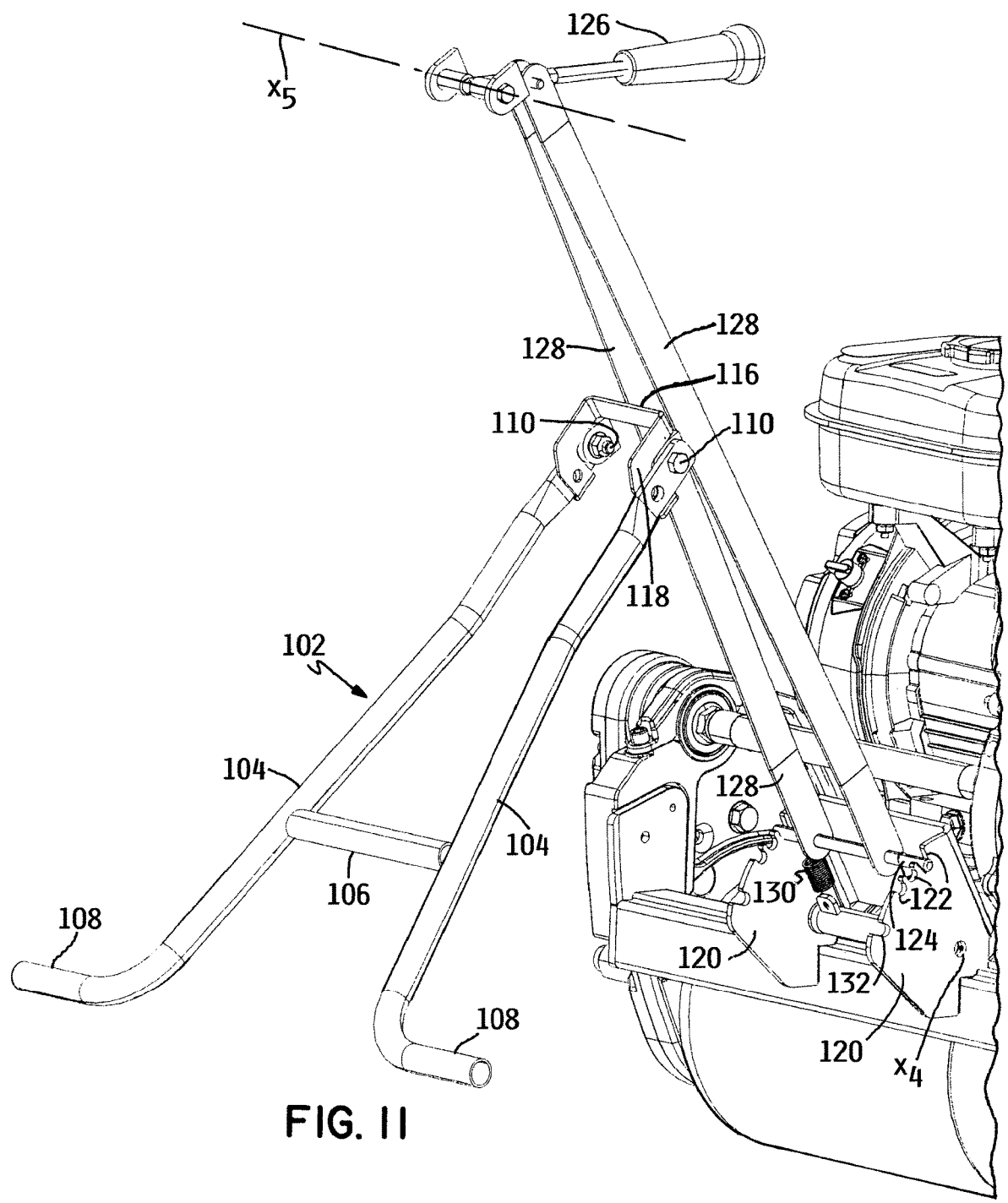
FIG. 11 is a perspective view of the pivotal kickstand of FIG. 8 and of a portion of the handle assembly of FIG. 8, particularly illustrating that portion of the handle assembly that locks or retains the handle assembly in a pivotally adjusted position on the frame of the mower of FIG. 1.

The remaining second major component of kickstand assembly 100 is the pivotal mounting of handle assembly 26 on mower frame 4 between a pair of parallel, laterally spaced quadrant plates 120 that form part of mower frame 4. The lower end of handle assembly 26 is pivotally mounted by a horizontal pivot 122 for pivotal rotation about a substantially horizontal pivot axis $x_4$. The top edges of plates 120 have three spaced, upwardly facing detents 122 that permit the user to adjust the angle of inclination of handle assembly 26, and thus the elevation of hand grip 28 above the ground, into one of three different settings, namely a high, medium or low setting, depending upon which detent 122 is used. The pivotal height adjustment of handle assembly 26 can be locked in any one of the three settings depending upon which detent 122 receives a locking pin 124 on handle assembly 26. As shown in FIG. 11, pin 124 is received in the highest detent 122 corresponding to the high position of handle assembly 26, i.e. the position suited for users having taller than average height. The two detents 122 following the highest detent 122 correspond to the middle position of handle assembly 26, i.e. the position suited for users having average height, and to the low position of handle assembly 26, i.e. the positions suited for users having shorter than average height.

In order to reposition handle assembly 26 for the adjustment noted above, there must be a way for the user to temporarily unlock handle assembly 26 from plates 120. The structure for doing so is shown in FIG. 11. The handle unlocking structure comprises an operational control lever 126 that is pivotally mounted on an upper portion of handle assembly 26 for pivoting rotation about a fixed, horizontal pivot axis $x_5$. Lever 126 is linked by a pair of connecting straps 128 that are positioned above the pivot axis $x_5$ with the lower ends of straps 128 carrying pin 124. Pin 124 is biased downwardly by one or more springs 130 so as to seek engagement with detents 122. To release pin 124 from detent 122 in which it is currently received, the user pulls back or upwardly on lever 126, which pulls upwardly on straps 128, to thereby lift pin 124 upwardly against the bias of spring(s) 130 to disengage pin 124. Once pin 124 has been so disengaged, handle assembly 26 is then free to be adjusted relative to plates 120 by the user pushing down on hand grip 28 of handle assembly 26.

Once handle assembly 26 is freed for pivotal motion relative to plates 120, the initial pivoting of handle assembly 26 will be in an angular range that covers the three detents 122 that determine the height of handle assembly 26 to adjust the vertical position of hand grip 28 above the ground to suit the height of a particular user. Any pivotal motion of handle assembly 26 in a downward direction will, of course, begin to lower kickstand 102 as well feet 108 thereon lower toward the ground g. However, the initial pivoting of handle assembly 26 over the range of detents 122 will not cause feet 108 of kickstand 102 to contact the ground g. Handle assembly 26 must be pivoted further than that for kickstand 102 to come into contact with the ground.

Thus, plates 120 are extended to provide a fourth lower detent 132 that is substantially closer to horizontal than the three height adjustment detents 122 described above. As the user continues pivoting handle assembly 26 past height adjustment detents 122 in order to reach fourth detent 132, kickstand 102 will come into contact with the ground in the early stages of this continued pivoting. Once this occurs, the user then must use additional force on handle assembly 26 to cause handle assembly 26 to finish the degree of continued pivoting of handle assembly 26 that is required to reach fourth detent 132. During this finishing portion of the continued pivoting, handle assembly 26 acts as a lever with respect to the ground engaged kickstand 102 such that a mechanical advantage is provided to the user much like a jack handle. The downward force applied by the user during the finishing portion of the continued pivoting will act to pull mower 2 frame rearwardly back towards and slightly over the ground engaged kickstand 102 to lift drum 14 up out of contact with the ground. When the pivotal handle assembly reaches fourth detent 132 and pin 124 seats therein, kickstand 102 will be fully deployed with drum 14 sufficiently elevated relative to the ground to enable installation or removal of transport wheels 22. The mechanical advantage provided by the pivotal handle assembly 26 makes the job of fully deploying kickstand 102 much easier than is true of prior art kickstands previously used on walk reel mowers.

The Swinging Drum

Figure 12:
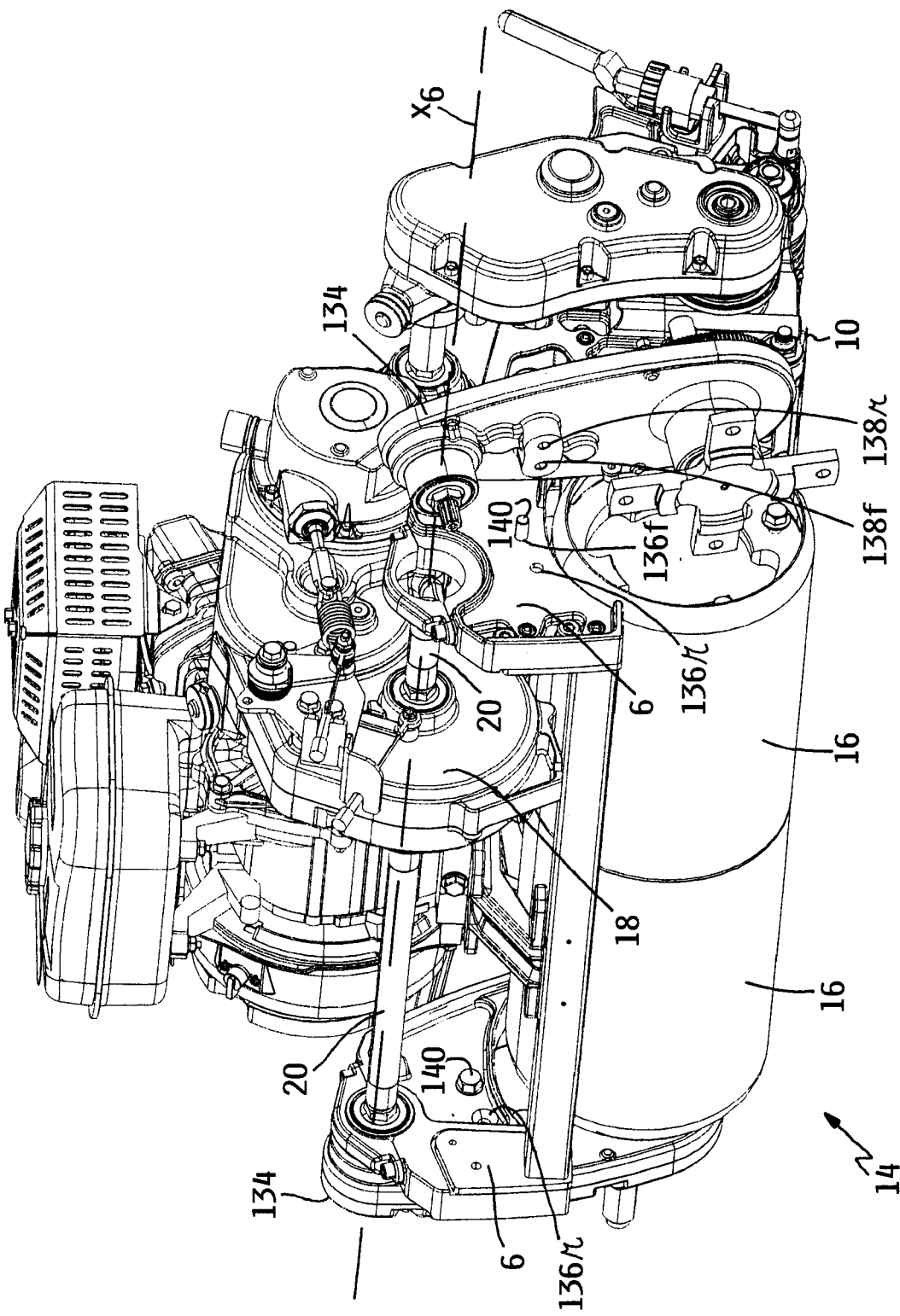
FIG. 12 is an enlarged perspective view of a portion of the mower of FIG. 1, particularly illustrating the drum and the gearboxes that pivotally support the drum for swinging on the rear of the mower, and further illustrating one of the gearboxes having been exploded from the rear of the mower and having been turned in FIG. 12 from its usual orientation on the mower to expose the backside of the gearbox to thereby more clearly illustrate the pivot and retention structure for retaining the drum in either of the two alternative positions of the drum shown in FIGS. 13 and 14.

Referring now to FIG. 12, drum halves 16 that comprise drum 14 are rotatably journalled at the lower ends of a pair of gearboxes 134. Since there are two drum halves 16, there are two gearboxes 134, one on each side of mower 2, for supporting and driving drum halves 16. Gearboxes 134 are generally identical to one another. Thus, a description of one gearbox 134 will suffice to describe the other gearbox.

The right side gearbox 134 is shown in FIG. 12 in an exploded and turned orientation relative to its normal position. Each gearbox 134 houses a gear train which is operatively powered by one of the differential drive shafts 20. The purpose of the gear train is to carry the drive torque received from differential drive shaft 20 down through gearbox 134 to correspondingly drive the adjacent drum half 16. Rather than fix gearbox 134 in place on mower frame 4, one aspect of this invention is to permit gearbox 134 to pivot about the horizontal pivot axis $x_6$ defined by the aligned differential drive shafts 20. See FIG. 16. Since drum halves 16 are rotatably journalled in the lower ends of gearboxes 134, pivoting of gearboxes 134 relative to mower 2 frame will also carry drum 14 as well and pivot drum 14 through an arc as the lower ends of gearboxes 134 pivot through an arc.

As can be seen in FIG. 12, side plate 6 that is adjacent to gearbox 134 and the backside of gearbox 134 includes a retention mechanism that locks or retains gearbox 134 in one of two pivotally adjusted positions. The retention mechanism includes 1) two spaced holes in side plate 6, namely a front hole 136$f$ and a rear hole 136$r$, 2) two similarly threaded bores in the backside of gearbox 134, namely a front bore 138$f$ and a rear bore 138$r$, and 3) a retention bolt 140 in the form of a threaded machine bolt. At any one time, bolt 140 is received in only one of the two sets of holes and bores, i.e. bolt 140 passes through front hole 136$f$ in side plate 6 to be threaded into front bore 138$f$ on the backside of gearbox 134 or, alternatively, bolt 140 passes through rear hole 136$r$ in side plate 6 to be threaded into rear bore 138$r$ on the backside of gearbox 134. Bolt 140 on each gearbox in FIG. 12 is shown passing through front hole 136$f$ on side plate 6 to be receivable in front bore 138$f$ on the backside of gearbox 134. In this location of bolt 140, gearboxes 134 and drum 14 carried thereby are placed in a first mowing position as shown in FIG. 13.

Figure 13:
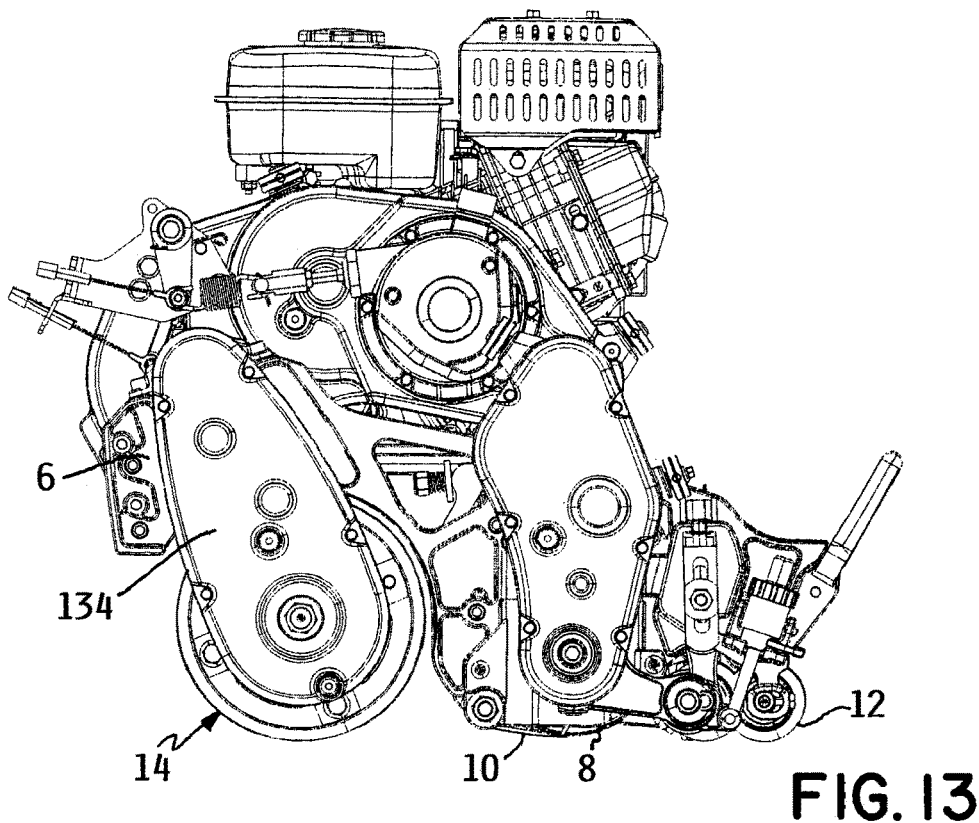
FIG. 13 is a side elevational view of the portion of the mower shown in FIG. 12, particularly illustrating the drum of the mower in a first mowing position.

The first mowing position shown in FIG. 13 is what might be thought of as the normal mowing position for a mower that comprises a greensmower. This is the position required for mowing the greens on a golf course to the very low heights of cut that are required in this application. However, the Applicants have noticed that when one adjusts the height of cut of mower 2 by moving front roller 12 downwardly on mower frame 4 in a generally conventional manner to attempt to achieve heights of cut greater than the relatively small range of very low heights of cut for which mower 2 was designed, the interface between reel 8 and bedknife 10 shifts rearwardly from its optimum position for cutting grass. Thus, if one attempts to cut grass with cuts of height exceeding the maximum height of cut for which mower 2 was designed, mower 2 may still cut the grass, but will do so very inefficiently in terms of power usage and not as cleanly as one would prefer.

Figure 14:
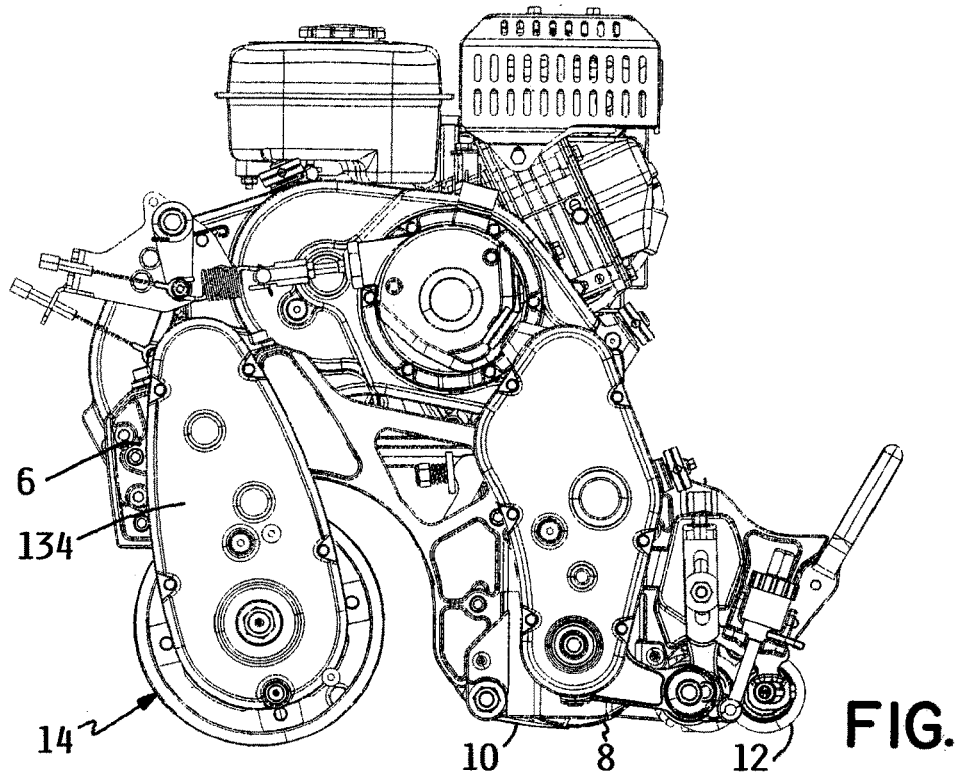
FIG. 14 is a side elevational view similar to FIG. 13, but showing the drum having been swung into a second mowing position in which the drum elevates the rear of the mower to a somewhat higher level than in the first mowing position to configure the mower for properly cutting grass at higher heights of cut than the optimal heights of cut that can be achieved in the first mowing position.

There are certain situations where the user of mower 2 would wish to cut grass at heights of cut above the range for which mower 2 was designed without experiencing any degradation in the quality of cut or the efficiency of power usage. For example, rather than cutting grass on the greens of a golf course in the height of cut range comprising 0.06 inches to 0.312 inches, the user might want to cut grass on the tees of the golf course at higher heights of cut in the range comprising 0.250 inches to 1.000 inches. Rather than have two separate mowers to do this, it would be advantageous to be able to use a single mower to do both. In mower 2 of this invention, this can be accomplished by moving drum 14 out of the first mowing position shown in FIG. 13 and by placing drum 14 into an adjusted position in which drum 14 has moved further back and slightly downwardly into a second mowing position as shown in FIG. 14.

The above-described adjustment of drum 14 can be quickly and easily accomplished. The user simply unscrews the two retention bolts 140 that hold gearboxes 134 in place on mower frame 4. This frees gearboxes 134 and drum 14 carried by gearboxes 134 for pivoting motion about the pivot axis $x_6$. The user then grips one of gearboxes 134 or an axle of drum 14 to swing or pivot gearboxes 134 about the pivot axis $x_6$. The user then watches rear hole 136$r$ in one side plate 6 to see when rear bore 138$r$ in the corresponding gearbox 134 becomes aligned with rear hole 136$r$. When this happens, the user then reinserts one of the retention bolts 140 through rear hole 136$r$ and into rear bore 138$r$ to secure gearbox 134 and thus drum 14 in the pivotally adjusted position. Obviously, the user would also reinsert the other retention bolt 140 through rear hole 136r and into rear bore 138r for side plate 6 and gearbox 134 provided on the other side of mower 2. This additional rear hole and rear bore will register with one another for reception of the other retention bolt 140 after gearbox 134 on one side has been bolted into its adjusted position.

With this pivotal adjustment having been made, the lowering of drum 14 relative to mower frame 4 will cause the rear end of frame 4 to lift up or elevate above the position it would have had if this adjustment had not been made. This elevation of the rear end of mower frame 4 causes the interface between bedknife 10 and reel 8 to be shifted forwardly to its most efficient cutting position, even when front roller 12 of mower 2 is additionally vertically adjusted downwardly to achieve higher heights of cut. Thus, mower 2 of this invention with the swinging drum feature as just described can do double duty, cutting grass on both the greens and the tees of golf courses even though tees require higher heights of cut than do greens, without sacrificing power usage or quality of cut. This is achieved by the selective repositioning of drum 14 on mower frame 4 between one of the two different available mowing positions shown in FIGS. 13 and 14.

The Pivotal Grass Shield

Figure 15:
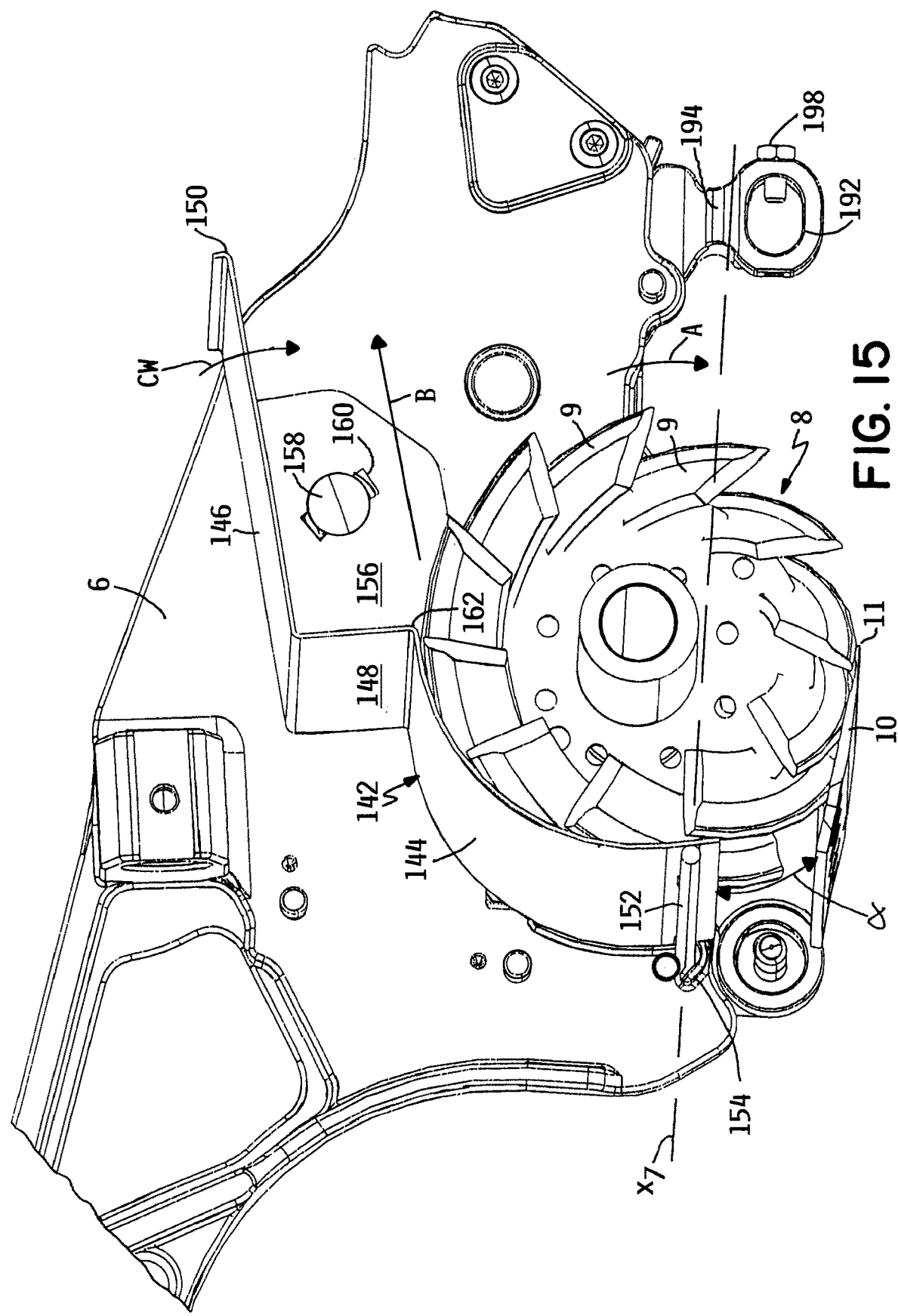
FIG. 15 is a side elevational, cross-sectional view of a portion of the mower of FIG. 1, particularly illustrating a grass deflecting shield associated with the cutting reel of the mower for directing grass clippings cut by the interaction of the cutting reel and the bedknife upwardly and forwardly on the mower frame.

Referring now to FIG. 15, the lower portion of the orbit of reel 8 rotates rearwardly towards cutting edge 11 of bedknife 10 as indicated by the arrow A. The grass clippings generated by the cutting interaction between reel 8 and bedknife 10 would without more be thrown to the rear of mower frame 4. However, it is desirable that the grass clippings be redirected into a front mounted grass catcher (not shown) which is ordinarily mounted on the front of mower frame 4 with the open mouth of the grass catcher facing rearwardly towards the top half or so of reel 8. Thus, the grass clippings must be confined by some structure to flow up and around the rear of reel 8 to be thrown forwardly relative to mower frame 4 in the direction of arrow B.

Figure 16:
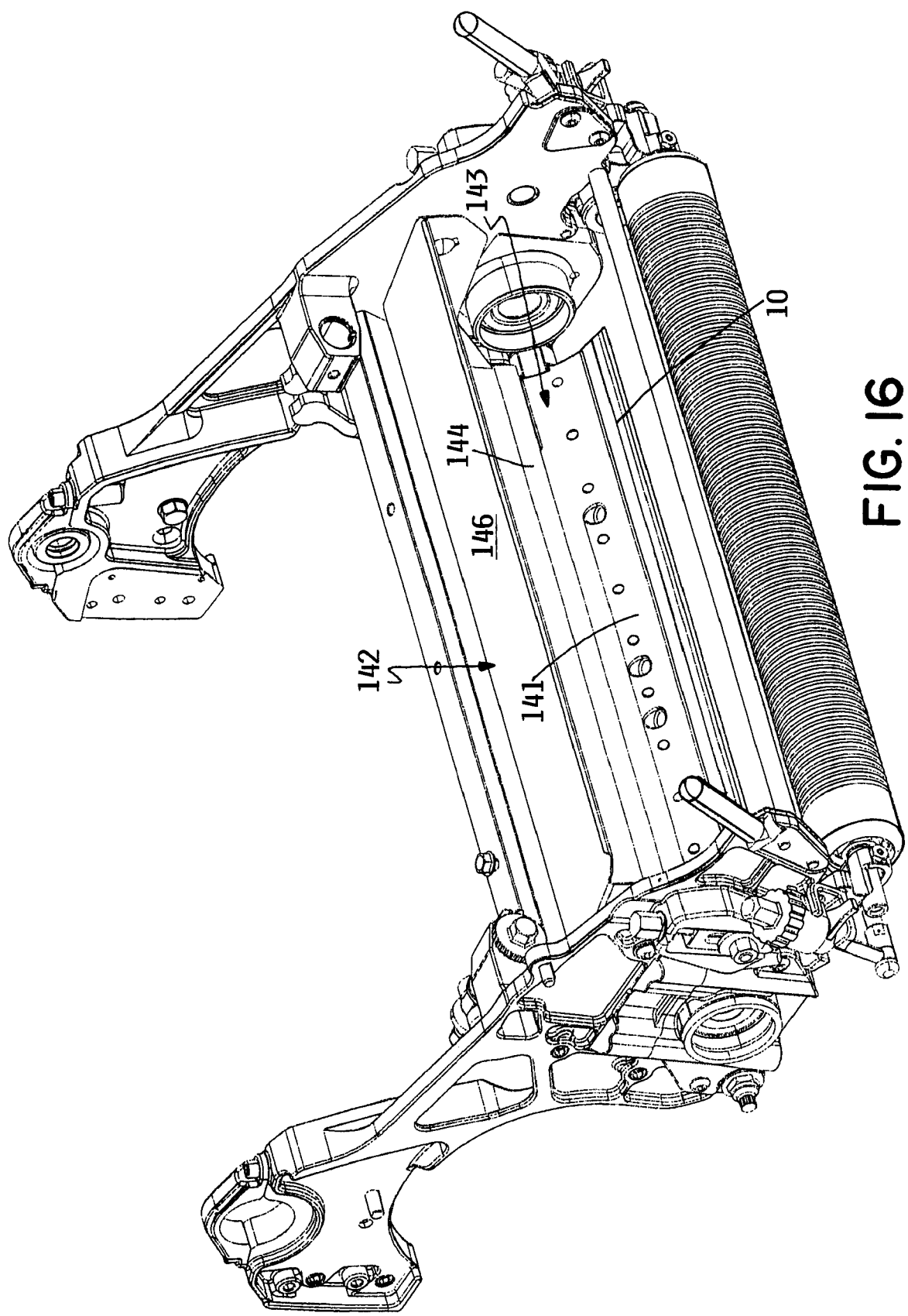
FIG. 16 is a perspective view from the front of the portion of the mower shown in FIG. 15 but with the reel having been removed to better illustrate the cooperation between the bedbar and a rear portion of the shield in forming a substantially continuous arcuate surface behind the reel.

The first portion of the confinement structure is provided by a curved front face 141 of a bedbar 143 that supports bedknife 10 on mower 2. See FIG. 16. Bedbar face 141 closes off the rear of reel 8 in the initial angular arc shown by the angle α in FIG. 15. The second portion of the confinement structure is a grass shield 142 that picks up the grass clippings from front face 141 of bedbar 143. One embodiment of shield 142 according to this invention is illustrated in FIGS. 15 and 16. Bedbar 143 is visible in FIG. 16 but has been removed from FIG. 15 to better illustrate shield 142.

Shield 142 is shaped to provide an arcuate rear portion 144, a substantially planar front portion 146 that is vertically located above and ahead of the rear portion, and a middle transition portion 148 that connects the front and rear portions. As shown in FIG. 15, rear shield portion 144 has an angular extent that is slightly more than 90° or so extending from the top of the angular extent a of bedbar face 141 to approximately the top of the orbit of reel 8. Thus, bedbar face 141 and rear shield portion 144 of shield 142 together form a substantially continuous, arcuate grass clipping confinement surface that is closely spaced behind the circular rear half of the orbit of reel 8.

Front shield portion 146, though being positioned vertically above rear shield portion 144, extends from the termination of rear shield portion 144 by a substantial distance such that the front edge 150 of front shield portion 146 terminates substantially ahead of the forwardmost portion of reel 8. Middle shield portion 148 is a substantially vertical wall connecting rear shield portion 144 to front shield portion 146, though such wall could be inclined rather than being vertical if so desired. Shield 142 extends laterally over substantially the full width of mower frame 4 but with opposite sides of shield 142 terminating closely adjacent the interiors of side plates 6 of mower frame 4. See FIG. 16.

Referring now to FIG. 15, shield 142 includes a pivot rod 152 secured to rear shield portion 144 adjacent the lower end thereof generally where bedbar face 141 and rear shield portion 144 meet one another. Pivot rod 152 has opposite ends that are journalled in upwardly extending hook shaped sockets 154 on side plates 6 of mower frame 4. Thus, shield 142 is pivotally journalled for rotation on mower frame 4 about a substantially horizontal pivot axis $x_7$ defined by the axis of pivot rod 152.

Front shield portion 146 has downwardly extending flanges 156 located on the opposite sides thereof with each flange 156 being located relatively closely adjacent one side plate 6 of mower frame 4. A threaded fastener 158, such as a bolt, extends through an elongated slot 160 provided in each flange 156. Fasteners 158 would include nuts or the like that are tightened onto the shanks of fasteners 158 to bolt or clamp front shield portion 146 to side plates 6 of mower frame 4. This provides a releasable lock mechanism for holding shield 142 in a pivotally adjusted position on mower frame 4.

It is desired that rear shield portion 144 be closely spaced behind the portion of reel 8 that it covers. However, as reel 8 wears and the diameter of reel 8 begins to decrease, the desired spacing between rear shield portion 144 and reel 8 will begin to increase and thereby degrade from the optimal spacing therebetween. When this happens, the user can loosen fasteners 158, grab front edge 150 of shield 142, pivot shield 142 in a clockwise direction about pivot axis $x_7$ as indicated by the arrow CW in FIG. 15 until the junction line 162 between rear shield portion 144 and middle shield portion 148 has dropped down to the optimal spacing relative to the diameter of reel 8, and then retighten fasteners 158.

This pivotal adjustment of shield 142 can be quickly and easily done by the user. Moreover, prior art shields on walk reel mowers typically accommodate reel wear by vertically moving a separate downwardly protruding lip provided by a vertically adjustable wall carried on middle shield portion 148 down towards reel 8 with the lip moving below the arcuate surface of rear shield portion 144 as it is adjusted. The Applicants have found that this lip undesirably provides a surface on which grass clippings can build up with the lip then interfering with the smooth discharge of the grass clippings from rear shield portion 144. Shield 142 of this invention has no such lip but is made adjustable through the pivoting action provided by pivot rod 152. Thus, shield 142 of this invention has a rear shield portion 144 that presents a smooth continuous flow surface for the grass clippings along the entire length thereof without the buildup or clogging that often occurs on the adjustable lips found on prior art shields. The pivotally adjusted shield 142 described herein is not confined to use on walk reel mowers, but may be used on a reel cutting unit that is attached, either individually or in laterally spaced and staggered gang configurations, to a traction frame of a riding mower, or to the frame of a pull behind trailed implement, or the like.

The Drop Out Reel

Figure 17:
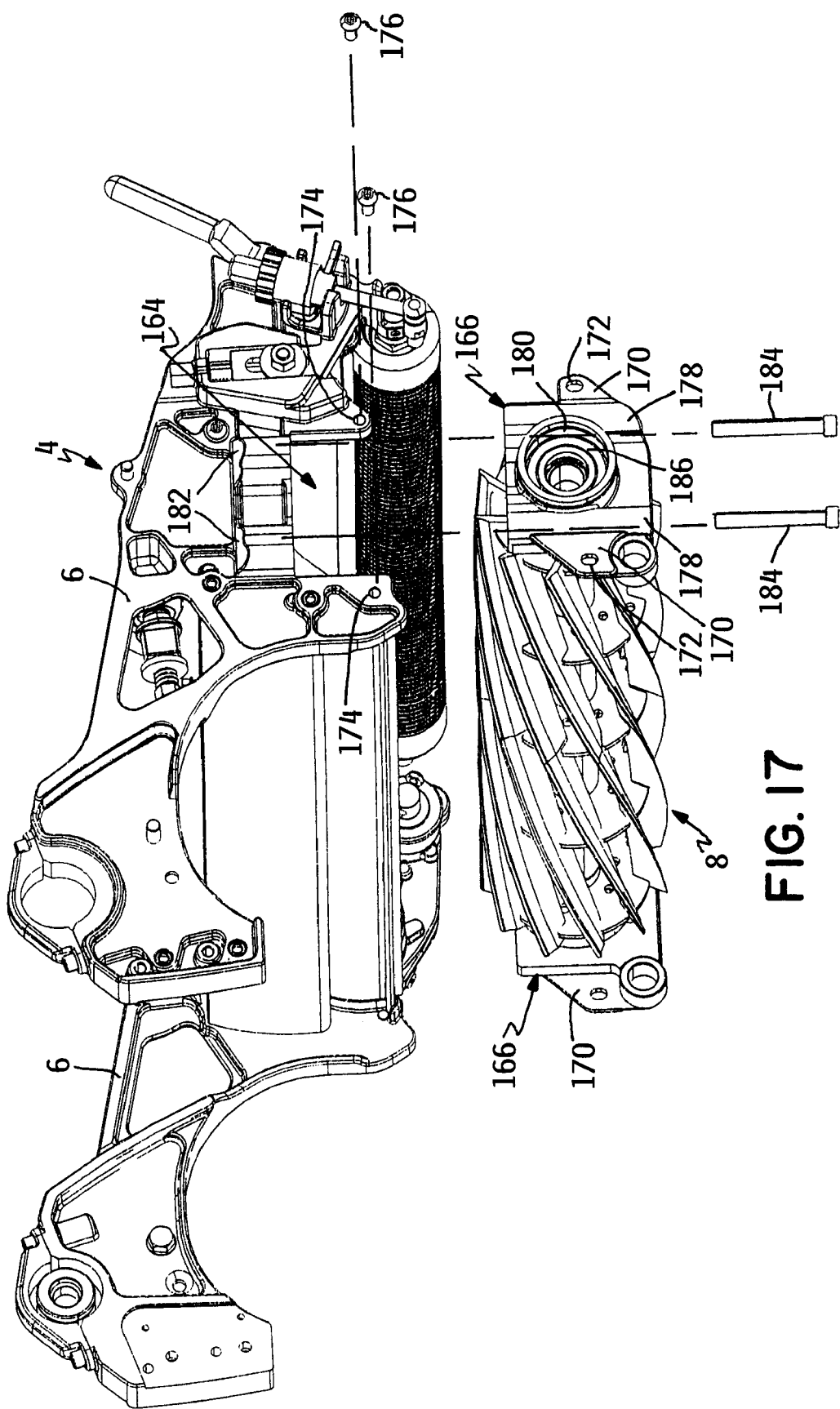
FIG. 17 is an exploded perspective view of a portion of the mower of FIG. 1, particularly illustrating the drop out cutting reel.

Referring now to FIG. 17, a further aspect of the mower of this invention is a mounting system that permits reel 8 to be easily installed in or removed from mower frame 4 without having to disassemble side plates 6 of mower frame 4 from the cross members that hold side plates 6 together. In this respect, side plates 6 have identical cutouts 164 provided therein with each cutout 164 being open along a bottom edge of side plate 6. The shape of cutouts 164 may vary, but in a preferred embodiment each cutout 164 is square or rectangular in shape having straight side edges and a straight top edge.

Figure 18:
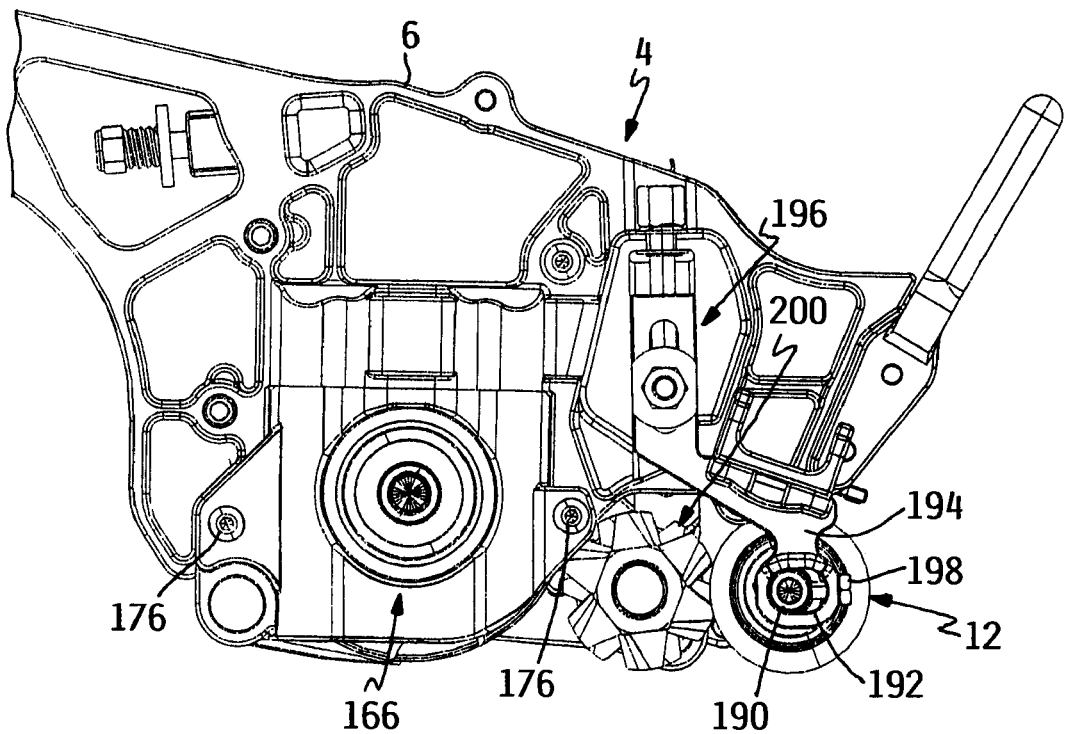
FIG. 18 is a side elevational view of a portion of the mower of FIG. 1, particularly illustrating a rearward position of the front roller that permits partial nesting of the blades of the turf groomer with the grooves of the front roller.

Similarly shaped inserts 166 are provided that are designed to fit into cutouts 164 to fill in cutouts 164 and thereby complete or fill out side plates 6 of mower frame 4. When so installed, upper portions of the side edges of each insert 166 will abut against the side edges of one cutout 164 and the top edge of each insert 166 will abut against the top edge of such cutout. The side edges of each insert 166 are provided with outwardly extending tabs 170. Tabs 170 carry apertures 172 that will align with threaded bores 174 provided in side plates 6 adjacent the side edges of cutouts 164 when inserts 166 are installed in cutouts 164. Threaded machine fasteners 176 will pass through apertures 172 in tabs 170 of inserts 166 to be threaded into the bores 174 in side plates 6 to clamp inserts 166 in place on side plates 6. FIG. 18 shows one insert 166 in place in a cutout 164 on one side plate 6 of mower frame 4.

The two side mounted fasteners 176 are not the only fasteners that secure each insert 166 in its corresponding cutout 164. In addition, each insert 166 has a pair of thickened vertical ribs 178 with one rib 178 being located ahead of a circular opening 180 in insert 166 and the other rib 178 being located behind opening 180. Side plates 6 have similarly positioned ribs 182 extending upwardly from the top edges of cutouts 164. When inserts 166 are installed in cutouts 164, ribs 178 on inserts 166 will abut with ribs 182 on side plates 6. Ribs 178 on inserts 166 have drilled vertical passages (not shown) extending all the way therethrough along the length thereof with such passages being open at both the top and the bottom thereof. Ribs 180 on side plates 6 have threaded vertical bores therein (not shown) which bores are aligned with the drilled passages in ribs 178 on inserts 166 when inserts 166 are received in cutouts 164. Two additional bottom mounted machine fasteners 184 are used to secure each insert 166 in its corresponding cutout 164. The additional fasteners 184 pass upwardly through the drilled passages in ribs 178 on insert 166 to be threaded into the bores in ribs 182 on side plates 6. Thus, a total of four fasteners, namely the two side mounted fasteners 176 and the two bottom mounted fasteners 184, are used to rigidly affix each insert 166 in its corresponding cutout 164 to thereby complete each side plate 6.

The opposite ends of reel 8 carry bearing assemblies 186 that are positioned within circular openings 180 in insert 166 such that reel 8 and insert 166 effectively form a sub-assembly for the purpose of installation and removal from side plates 6 of mower frame 4. In order to install or remove the sub-assembly, the gearbox driving reel 8 from the engine has to be removed from one side plate 6, the gearbox driving the turf groomer from reel 8 if a turf groomer is installed has to be removed from the other side plate 6, the turf groomer if installed has to be removed from between reel 8 and front roller 12, and bedbar 143 and bedknife 110 have to be removed. After the removal of these components, inserts 166 and their fasteners 176 and 184 will be accessible to the user. When the fasteners 176, 184 holding each insert 166 in its corresponding cutout 164 have been removed (a total of eight fasteners), the subassembly comprising reel 8 carried between inserts 166 will simply drop out of cutouts 164 in side plates 6 without there being any need to disassemble side plates 6 themselves, or remove front roller 12, or remove drum 14, or remove handle assembly 26. This greatly eases the task of installing or removing reel 8 in case reel 8 is damaged and needs to be repaired or replaced.

The Two Position Front Roller

Figure 19:
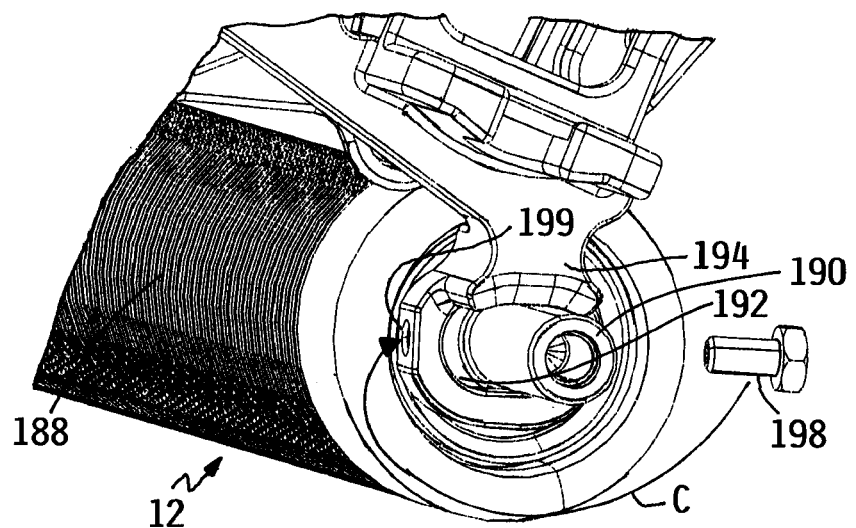
FIG. 19 is a perspective view of the front roller shaft support shown in FIG. 18, particularly illustrating a forward position of the front roller within the shaft support to accommodate a brush type turf grooming attachment without any partial nesting of the brush bristles within the grooves of the front roller.

Referring now to FIGS. 18 and 19, front roller 12 comprises a roller body 188 that is mounted for rotation by bearing assemblies (not shown) on a fixed through shaft 190. The opposite ends of shaft 190 are carried in longitudinally elongated, horizontal slots 192 (one of which is best shown in FIG. 15) that are located at the lower ends of arms 194 of roller height adjustment mechanisms 196 provided on side plates 6. A bolt 198 is provided that acts in the nature of a set screw to force or clamp shaft 190 against either the back end of slot 192 or the front end of slot 192. When so clamped, shaft 190 obviously does not itself rotate. Instead, roller body 188 rotates around fixed shaft 12 by virtue of the rotary motion permitted by the bearing assemblies interposed between roller body 188 and shaft 190.

FIG. 18 illustrates shaft 190 of the front roller clamped by bolt 198 against the rear end of slot 192. In this position, the knife blades of a conventional turf groomer 200 partially nest within the grooves of roller body 188 of front roller 12. In other words, the front of the orbit of the tips of the knife blades of turf groomer 200 will intersect slightly with the rear of the orbit of roller body 188 of front roller 12, but no damage is done since the knife blades are positioned on turf groomer 200 to pass through the grooves in roller body 188 of front roller 12 so as to avoid hitting roller body 188. It is desirable that the longitudinal wheel base of the mower, namely the distance between the axis of rotation of front roller 12 defined by the axis of shaft 190 and the axis of rotation of drum 14, be kept as short as possible. Thus, the rearward positioning of shaft 190 of front roller 12 which is achieved by clamping shaft 190 against the rear end of slot 192 is used as shown in FIG. 18.

Turf groomer 200 as shown herein using knife blades that are partially nested within the grooves of front roller 12 is not the only type of turf groomer that can be used to perform a turf grooming action on the grass. For example, a brush having flights of brush bristles (not shown) may be substituted for turf groomer 200 having the knife blades. If a brush type turf groomer of the same diameter as the knife carrying turf groomer 200 is used, no nesting should occur between the brush and the grooves of front roller 12. In this case, bolt 198 used to clamp shaft 190 in place can be removed from its position at the front of slot 192, shaft 190 can then be slid into contact with the front end of slot 192, and bolt 198 may then be reinserted into a threaded hole 199 at the rear side of arm 194 to clamp shaft 190 of front roller 12 against the front end of slot 192. This is illustrated in FIG. 19 with the reinstallation of bolt 198 at the rear side of arm 194 in rear hole 199 being diagrammatically indicated by the arrow C. Once this has been done, front roller 12 has now been moved to a more forward position within slot 192 that will accept a brush type turf groomer and provide enough space for such turf groomer that no nesting will take place between the brush bristles and front roller 12.

Accordingly, the two position front roller 12 as described above allows different types of turf groomers to be installed with nesting permitted when required while maintaining the shortest possible longitudinal wheel base and with additional space being provided when a non-nested configuration is more appropriate. This is all accomplished using a simple elongated slot 182 with shaft 190 of front roller 12 being clamped either against the rear end or the front end of slot 192 by a single repositionable bolt 198. While the description above refers to one side of shaft 190 in FIGS. 18 and 19, the same slot and bolt structure is present on the other side of shaft 190 such that the repositioning of shaft 190 has to be done on both ends of shaft 190 where such shaft ends pass through slots 192 in the arms 194 of height adjustment mechanisms 196.

Modifications

The foregoing description of mower 2 sets forth only one embodiment of a mower according to this invention. Various modifications of such embodiment will be apparent to those skilled in the art. For example, while it is possible that a single mower 2 might incorporate all the various features described above, the use of all the features together is not required. The features described above could each be used individually in a given mower 2 without using any of the other features. Alternatively, multiple features totaling less than all the features but more than one feature could be used in a given mower in various permutations and combinations thereof. Accordingly, the scope of this invention is to be limited only by the appended claims.

The invention claimed is:

1. A walk reel mower, which comprises:
   (a) a frame supported for rolling over the ground by a front roller and a pair of rotatable rear traction members carried by the frame, and wherein the rear traction members are powered by a prime mover carried by the frame to self-propel the frame over the ground;
   (b) a rearwardly and upwardly extending handle assembly on the frame to allow a user to stand behind the frame in a walk behind position and to grip the handle assembly and operate the mower from the walk behind position;
   (c) a reel cutting unit carried by the frame, wherein the reel cutting unit is fixed to the frame during a grass cutting operation such that the reel cutting unit is able to follow ground contours only through ground contour following provided by the front roller and rear traction members carried by the frame;
   (d) a height adjustment structure connecting the front roller to the frame to allow the vertical height of the front roller relative to the frame to be adjusted upwardly or downwardly to adjust a height of cut provided by the reel cutting unit; and
   (e) the rear traction members being supported by a mount which is carried by the frame and which is movable relative to the frame between first and second mowing positions, the frame further having a lock which holds the mount stationary on the frame when the mount has been placed by a user in a selected one of the first and second mowing positions such that the rear traction members are selectively repositionable by the user between the first and second mowing positions on the frame, the second mowing position being displaced vertically downwardly on the frame compared to the first mowing position, and wherein the movement of the rear traction members between the first and second mowing positions is independent of and separate from operation of the height adjustment structure.

2. The reel mower of claim 1, wherein the second mowing position is additionally displaced rearwardly on the frame compared to the first mowing position.

3. The reel mower of claim 2, wherein the mount comprises lower ends of drive housings that mount the rear traction members to the frame, and wherein the drive housings are pivotally mounted on the frame to pivot through an arc about a substantially horizontal pivot axis to pivotally move the drive housings and thus the rear traction members back and forth between the first and second mowing positions of the rear traction members.

4. The reel mower of claim 3, wherein the substantially horizontal pivot axis about which the drive housings pivot comprises an axis of a drive shaft that is driven by the prime mover and that provides mechanical power to the rear traction members through drive transmissions contained within the drive housings to achieve the self-propelling of the frame.

5. The reel mower of claim 4, wherein the drive shaft includes a differential therein to allow the rear traction members to rotate at different speeds during turns of the frame.

6. The reel mower of claim 3, wherein the rear traction members comprise side-by-side, split drum halves of an elongated traction drum that extends substantially across a lateral width of the frame.

7. The reel mower of claim 1, wherein the rear traction members comprise side-by-side, split drum halves of an elongated traction drum that extends substantially across a lateral width of the frame.

* * * * *